(12) United States Patent
Park et al.

(10) Patent No.: US 11,245,827 B2
(45) Date of Patent: Feb. 8, 2022

(54) PORTABLE ELECTRONIC DEVICE AND CAMERA MODULE WITH ROTATABLE REFLECTION MODULE

(71) Applicant: Samsung Electro-Mechanics Co., Ltd., Suwon-si (KR)

(72) Inventors: Nam Ki Park, Suwon-si (KR); Young Hwan Kwon, Suwon-si (KR); Young Bok Yoon, Suwon-si (KR); Hong Joo Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/870,100

(22) Filed: May 8, 2020

(65) Prior Publication Data

US 2020/0396358 A1    Dec. 17, 2020

(30) Foreign Application Priority Data

Jun. 14, 2019  (KR) .................. 10-2019-0070706
Aug. 7, 2019   (KR) .................. 10-2019-0096273

(51) Int. Cl.
*H04N 5/225* (2006.01)
*H04M 1/02* (2006.01)
(Continued)

(52) U.S. Cl.
CPC ........... *H04N 5/2254* (2013.01); *G02B 7/021* (2013.01); *G02B 7/09* (2013.01); *G02B 13/004* (2013.01);
(Continued)

(58) Field of Classification Search
CPC .. H04N 5/2254; H04N 5/2252; H04N 5/2253; H04N 5/2257; H04N 5/2251;
(Continued)

(56) References Cited

U.S. PATENT DOCUMENTS 10,678,062 B2 *  6/2020  Im ..................... G02B 27/646
2016/0109721 A1  4/2016  Min et al.
(Continued)

FOREIGN PATENT DOCUMENTS

CN    107942605 A    4/2018
CN    108427235 A    8/2018
(Continued)

OTHER PUBLICATIONS

Korean Office Action dated Aug. 3, 2020 in counterpart Korean Patent Application No. 10-2019-0096273 (8 pages in English and 6 pages in Korean).

(Continued)

*Primary Examiner* — Twyler L Haskins
*Assistant Examiner* — Akshay Trehan
(74) *Attorney, Agent, or Firm* — NSIP Law

(57) ABSTRACT

A camera module includes a housing, a rotation holder including a reflection member, and supported on an inner wall of the housing such that the reflection member is rotatable about a first axis, perpendicular to an optical axis and parallel to a bottom of the housing, a magnet provided on a side surface of the rotation holder, parallel to an optical axis direction, and a first position detection sensor provided in the housing to face the magnet and configured to sense movement of the rotation holder in a second axis direction, perpendicular to the optical axis and the first axis, wherein the magnet is disposed to be biased in a direction, opposite to the inner wall of the housing on which the rotation holder is supported in the optical axis direction.

19 Claims, 19 Drawing Sheets

(51) Int. Cl.
  *G02B 13/00* (2006.01)
  *G02B 7/09* (2021.01)
  *G03B 30/00* (2021.01)
  *G03B 17/17* (2021.01)
  *G03B 3/10* (2021.01)
  *G03B 5/00* (2021.01)
  *G03B 17/14* (2021.01)
  *G03B 13/36* (2021.01)
  *G02B 7/02* (2021.01)

(52) U.S. Cl.
  CPC ............... *G03B 3/10* (2013.01); *G03B 5/00* (2013.01); *G03B 13/36* (2013.01); *G03B 17/14* (2013.01); *G03B 17/17* (2013.01); *G03B 30/00* (2021.01); *H04M 1/0264* (2013.01); *H04N 5/2251* (2013.01); *H04N 5/2252* (2013.01); *H04N 5/2253* (2013.01); *H04N 5/2257* (2013.01); *G03B 2205/0069* (2013.01)

(58) Field of Classification Search
  CPC .......... G03B 30/00; G03B 3/10; G03B 5/00; G03B 13/36; G03B 17/14; G03B 17/17; G03B 2205/0069; G02B 7/09; G02B 7/021; G02B 13/004; H04M 1/0264
  USPC .................................................. 348/335–369
  See application file for complete search history.

(56) References Cited

U.S. PATENT DOCUMENTS

| | | | |
|---|---|---|---|
| 2018/0109660 A1* | 4/2018 | Yoon | G02B 7/10 |
| 2018/0224665 A1* | 8/2018 | Im | G02B 7/021 |
| 2018/0231793 A1* | 8/2018 | Jeong | H02K 1/34 |
| 2018/0367714 A1 | 12/2018 | Im et al. | |

FOREIGN PATENT DOCUMENTS

| | | | |
|---|---|---|---|
| CN | 207992659 U | 10/2018 | |
| CN | 208588884 U | 3/2019 | |
| KR | 10-2016-0045385 A | 4/2016 | |
| KR | 10-2016-0145371 A | 12/2016 | |
| KR | 20160145371 | * 12/2016 | ............... G02B 7/09 |
| KR | 10-2018-0092251 A | 8/2018 | |
| KR | 20180092251 | * 8/2018 | ............. G03B 13/36 |
| KR | 10-2018-0113730 A | 10/2018 | |

OTHER PUBLICATIONS

Chinese Office Action dated Jul. 22, 2021, in Counterpart Chinese Patent Application No. 202010536560.4 (17 pages in English and 12 pages in Chinese).

* cited by examiner

PORTABLE ELECTRONIC DEVICE AND CAMERA MODULE WITH ROTATABLE REFLECTION MODULE

CROSS-REFERENCE TO RELATED APPLICATIONS

This application claims the benefit under 35 USC 119(a) of Korean Patent Application No. 10-2019-0070706 filed on Jun. 14, 2019, and Korean Patent Application No. 10-2019-0096273 filed on Aug. 7, 2019, in the Korean Intellectual Property Office, the entire disclosures of which are incorporated herein by reference for all purposes.

BACKGROUND

1. Field

The present disclosure relates to a portable electronic device and a camera module.

2. Description of the Background

Recently, cameras have been standardly installed in portable electronic devices such as tablet personal computers (PCs), laptop PCs, and the like, as well as in smartphones. An autofocusing function, an optical image (e.g., a handshake) stabilization (OIS) function, a zoom function, and the like, have also recently been implemented in cameras for portable electronic devices.

For the implementation of various functions, however, a structure of a camera module has become complex and sizes of camera modules have increased, resulting in a portable electronic device in which the camera module is to be mounted having an increased size.

In addition, the camera module provided in the portable electronic device to improve the zoom function may include a folded module for refracting light by using a reflective member. The folded module may also implement the OIS function while simultaneously refracting the light by using the reflective member.

In the case of refracting the light using the reflective member, since the reflective member should be finely adjusted, relatively accurate position sensing is necessary. However, in a Hall sensor provided in a coiled portion of a conventional coil, there are problems that, according to positional limitations, when a current is applied to the coil, position distortion may occur, or when a position of a magnet is slightly shifted due to assembly tolerance or external impact, a degree of position sensing accuracy may be significantly deteriorated.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a housing, a rotation holder including a reflection member, and supported on an inner wall of the housing such that the reflection member is rotatable about a first axis, perpendicular to an optical axis and parallel to a bottom of the housing, a magnet disposed on a side surface of the rotation holder, parallel to an optical axis direction, and a first position detection sensor disposed in the housing to face the magnet and configured to sense movement of the rotation holder in a second axis direction, perpendicular to the optical axis and the first axis, wherein the magnet is disposed to be biased in a direction, opposite to the inner wall of the housing on which the rotation holder is supported in the optical axis direction.

The first position detection sensor may be disposed to be biased in a direction, opposite to the inner wall of the housing, from a center of the magnet in the optical axis direction.

The magnet may be a two-pole magnet magnetized with two poles, and of which an N pole and an S pole are sequentially arranged in the second axis direction in which the rotation holder is configured to move.

The first position detection sensor may be disposed to face an intermediate region in which the N pole and the S pole of the magnet meet, when the rotation holder is not driven.

The magnet may be provided with a neutral zone between the N pole and the S pole, and a center of the neutral zone may be disposed to face a center of the first position detection sensor, when the rotation holder is not driven.

The magnet may be a sensing magnet disposed separately from driving force of the rotation holder.

The first position detection sensor may be disposed to be parallel to a driving coil configured to provide driving force to the movement of the rotation holder in the first axis direction.

The camera module may further include a second position detection sensor configured to sense the movement of the rotation holder in the first axis direction.

The second position detection sensor may be disposed to be parallel to a driving coil configured to provide driving force rotating the rotation holder about the first axis.

The second position detection sensor may be configured to detect a change in a position of a driving magnet providing driving force moving the rotation holder in the first axis direction.

A portable electronic device may include the camera module further including a lens module configured to refract light reflected from the reflection member, and an image sensor configured to convert the refracted light into an electrical signal to capture an image.

In another general aspect, a camera module includes a housing, a rotation holder including a reflection member, and supported on an inner wall of the housing such that the reflection member is movable along a first axis, perpendicular to an optical axis and parallel to a bottom of the housing, and in a second axis direction, perpendicular to the optical axis and the first axis, a sensing magnet disposed on a side surface of the rotation holder, parallel to an optical axis direction, a driving magnet disposed on the side surface of the rotation holder and parallel to the sensing magnet and configured to provide driving force to move the rotation holder in the first axis direction, and a position detection sensor disposed in the housing configured to detect a change in position of the sensing magnet and the driving magnet, to sense the movement of the rotation holder in the second axis direction.

The sensing magnet may be disposed to be biased in a direction, opposite to the inner wall of the housing on which the rotation holder is supported, in the optical axis direction.

The position detection sensor may be disposed to be further biased in a direction, opposite to the inner wall of the housing, from a center of the sensing magnet in the optical axis direction.

The driving magnet and the sensing magnet may be arranged such that an N pole and an S pole are sequentially formed in the second axis direction in which the rotation holder is moving.

The driving magnet and the sensing magnet may be arranged in parallel, and the position detection sensor may be disposed to face a boundary between the driving magnet and the sensing magnet.

The driving magnet may be a two-pole magnet magnetized such that the N pole and the S pole are sequentially formed in the optical axis direction, the sensing magnet may be disposed adjacent to the N pole or the S pole of the driving magnet, and the sensing magnet adjacent to the driving magnet may be disposed adjacent to polarity, different from polarity of the driving magnet.

The driving magnet and the sensing magnet may be disposed in close contact or spaced apart from each other.

In another general aspect, a camera module includes a housing, a reflecting member disposed in the housing, configured to reflect incident light to an optical axis, and one or more of rotate about a first axis perpendicular to the optical axis and rotate about a second axis perpendicular to the first axis and the optical axis direction, a magnet disposed on a side surface of the reflecting member parallel to the optical axis, and a position sensor disposed in the housing to one or more of face the magnet in the first direction and configured to detect a movement of the magnet in the second direction when rotation about the first axis and face the magnet in the second direction and configured to detect a movement of the magnet in the first direction when rotation about the second axis.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
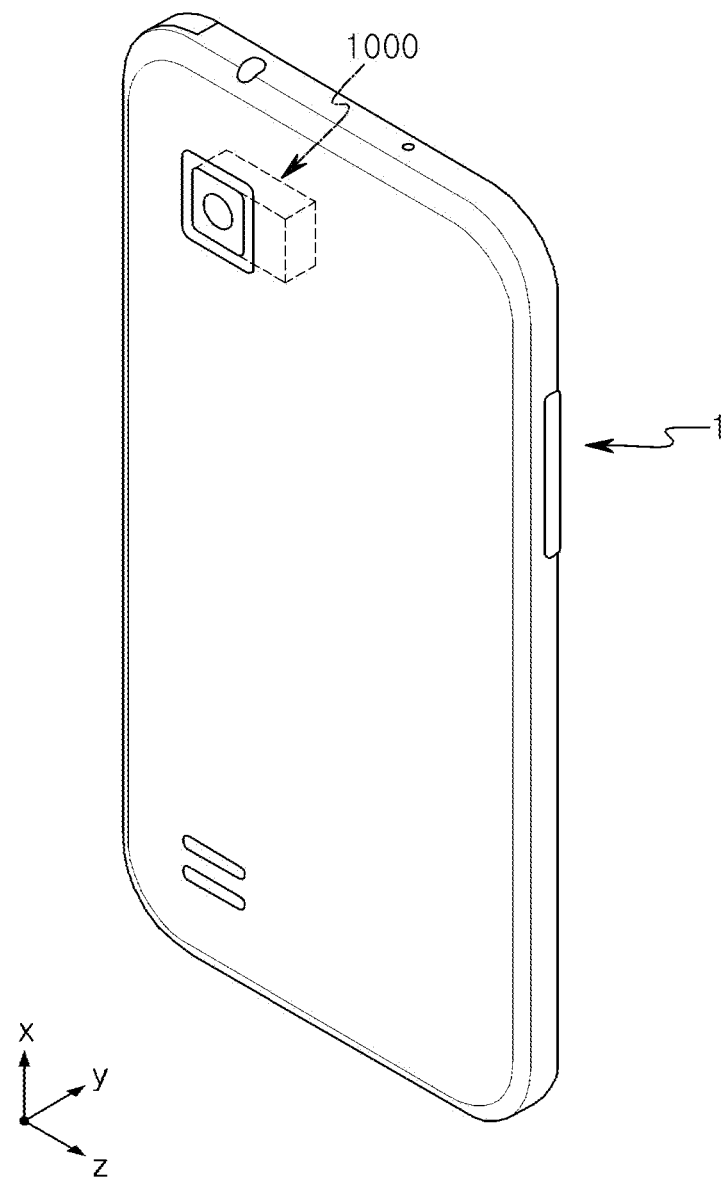
FIG. 1 is a perspective view illustrating a portable electronic device according to an example of the present disclosure.

Hereinafter, while examples of the present disclosure will be described in detail with reference to the accompanying drawings, it is noted that the present disclosure is not limited to the examples presented.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may be also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of this disclosure. Further, although the examples described herein have a variety of configurations, other configurations are possible as will be apparent after an understanding of this disclosure.

Herein, it is noted that use of the term "may" with respect to an example, for example, as to what an example may include or implement, means that at least one example exists in which such a feature is included or implemented while all examples are not limited thereto.

An aspect of the present disclosure is to solve the above problems, to minimize influence of a current applied to a coil, to minimize deterioration in position sensing accuracy, even when a position of a magnet is slightly shifted by assembly tolerance or external impact, and is to provide portable electronic device, a camera module, including a Hall sensor, capable of increasing sensing sensitivity according to a relative position with a magnet to increase a degree of sensing accuracy.

FIG. 1 is a perspective view illustrating a portable electronic device according to an example of the present disclosure.

Referring to FIG. 1, a portable electronic device 1 according to an example of the present disclosure may be a portable electronic device such as a mobile communications terminal, a smartphone, a tablet personal computer (PC), smart watch, smart glasses, or the like, in which a camera module 1000 is mounted.

Referring to FIG. 1, the portable electronic device 1 may be provided with the camera module 1000 to capture an image of a subject.

In this example, the camera module 1000 may include a plurality of lenses, and an optical axis (a Z axis) of the lenses may be disposed in a direction, perpendicular to a thickness direction (a Y axis direction, or a direction from a front surface of the portable electronic device to a rear surface thereof, or an opposite direction to the direction from the front surface of the portable electronic device to the rear surface thereof) of the portable electronic device 1.

In an example, the optical axis (the Z axis) of the plurality of the lenses provided in the camera module 1000 may be formed in a width direction or a length direction (an X axis direction or the Z axis direction) of the portable electronic device 1.

Therefore, even when the camera module 1000 has the autofocus (AF), zoom, and OIS functions, and the like, a thickness of the portable electronic device 1 may be made not to increase. Therefore, the portable electronic device 1 may be made thinner.

The camera module 1000 according to an example of the present disclosure may have at least one of the AF, zoom, and OIS functions.

The camera module 1000 having the AF, zoom, and OIS functions requires various components, leading to an increased size of the camera module compared to a conventional camera module without the AF, zoom, and OIS functions.

The increased size of the camera module 1000 may give rise to an issue with respect to the miniaturization of the portable electronic device 1 in which the camera module 1000 is mounted.

For example, the camera module has an increasing number of stacked lenses for the zoom function. When multiple lenses are stacked in the thickness direction of the portable electronic device, the thickness of the portable electronic device may increase, depending on the number of the stacked lenses. Therefore, a sufficient number of the stacked lenses may not be secured without increasing the thickness of the portable electronic device, thereby deteriorating the zoom function.

In addition, an actuator moving a lens group in an optical axis direction or a direction perpendicular to the optical axis needs to be installed in order to implement the AF function and the OIS function, and when the optical axis (the Z axis) of the lens group is formed in the thickness direction of the portable electronic device, the actuator moving the lens group needs also to be installed in the thickness direction of the portable electronic device. Therefore, a thickness of the portable electronic device may be increased.

In the camera module 1000 according to the example of the present disclosure, the optical axis (the Z axis) of each of the plurality of lenses is disposed perpendicularly to the thickness direction of the portable electronic device 1. Therefore, even in the case that the camera module 1000 having the AF function, the zoom function, and the OIS function is mounted in the portable electronic device 1, the portable electronic device 1 may be miniaturized.

Figure 2:
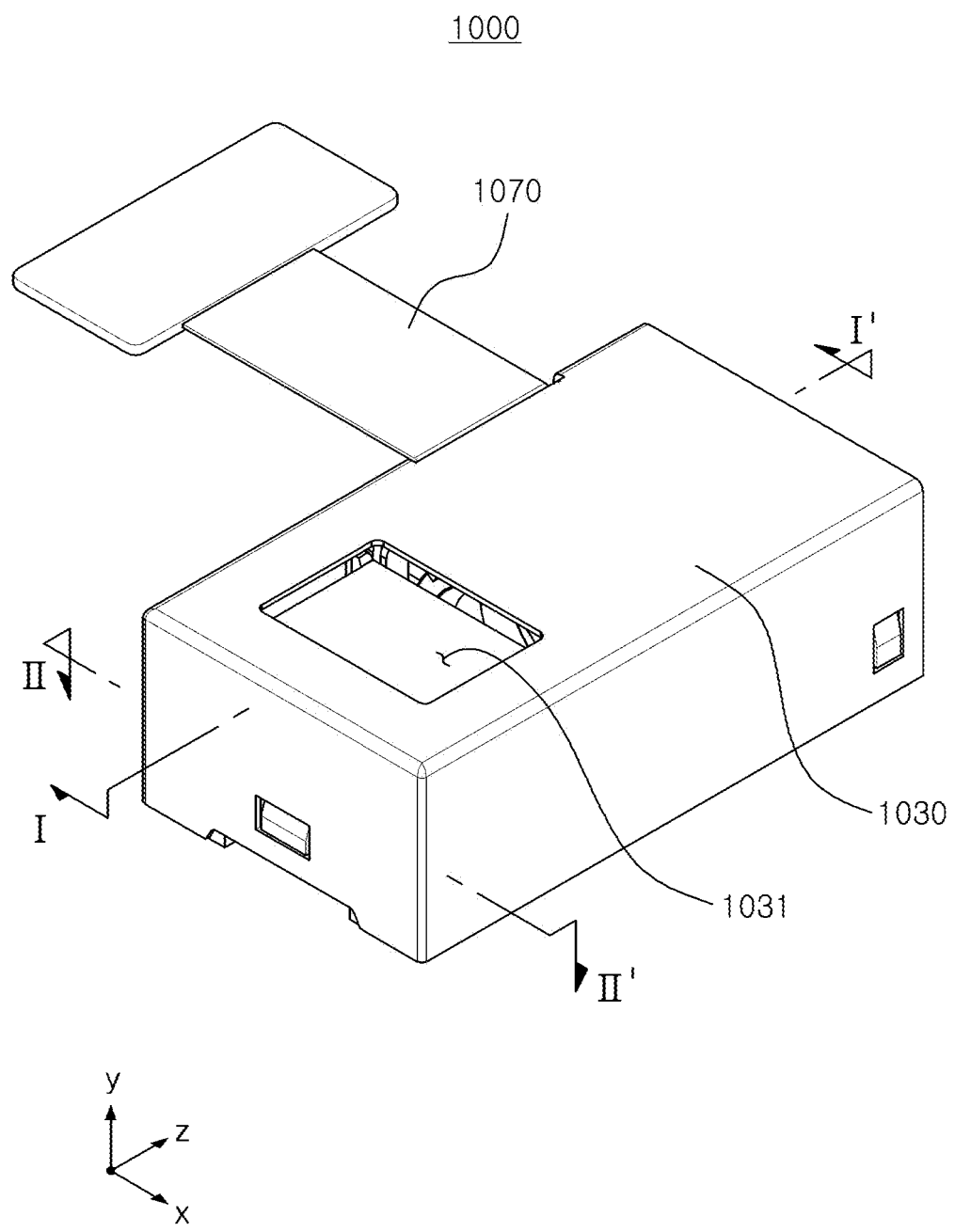
FIG. 2 is a perspective view illustrating a camera module according to an example of the present disclosure.
Figure 3A:
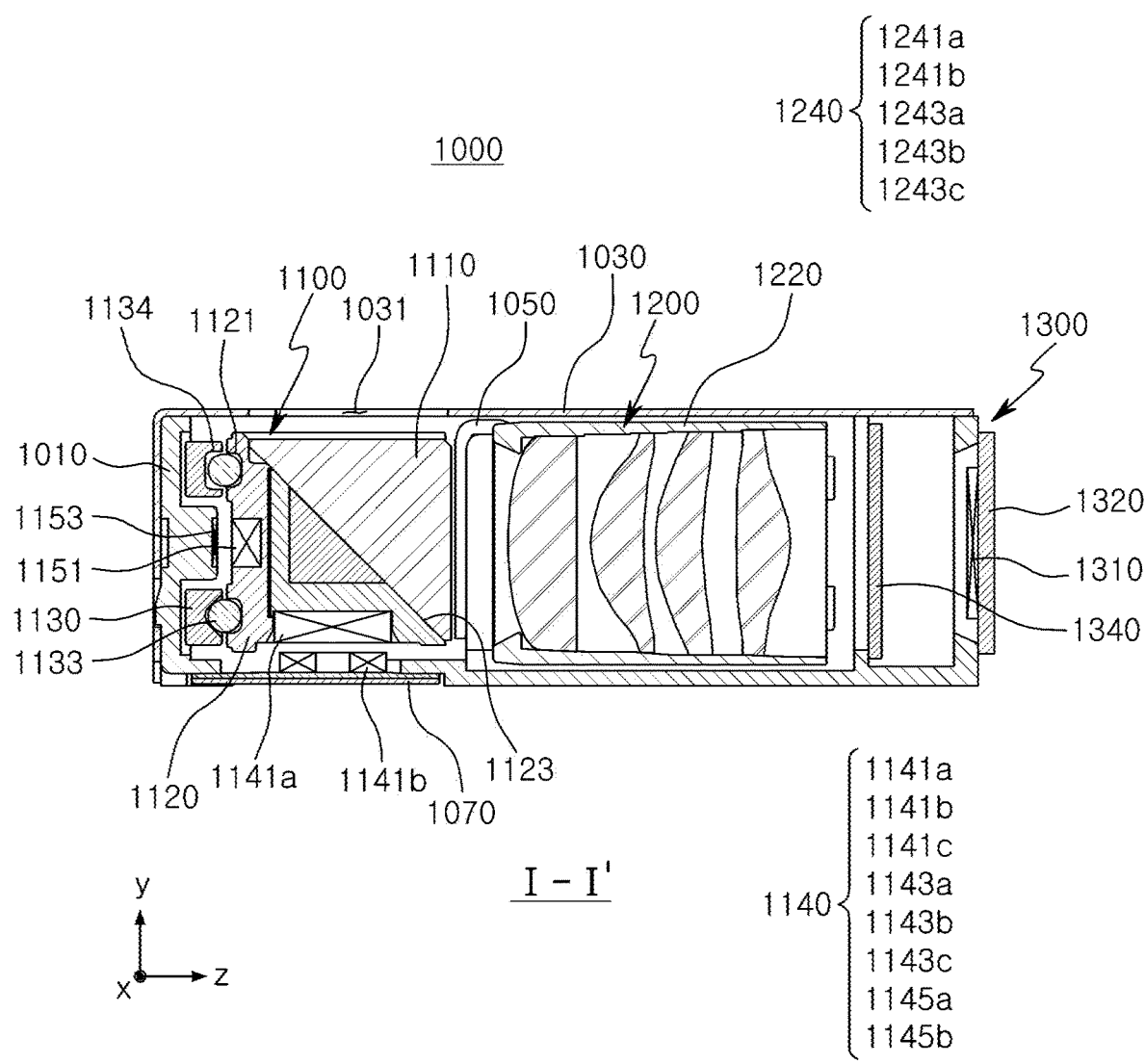
FIGS. 3A and 3B are cross-sectional views illustrating a camera module according to an example of the present disclosure.
Figure 3B:
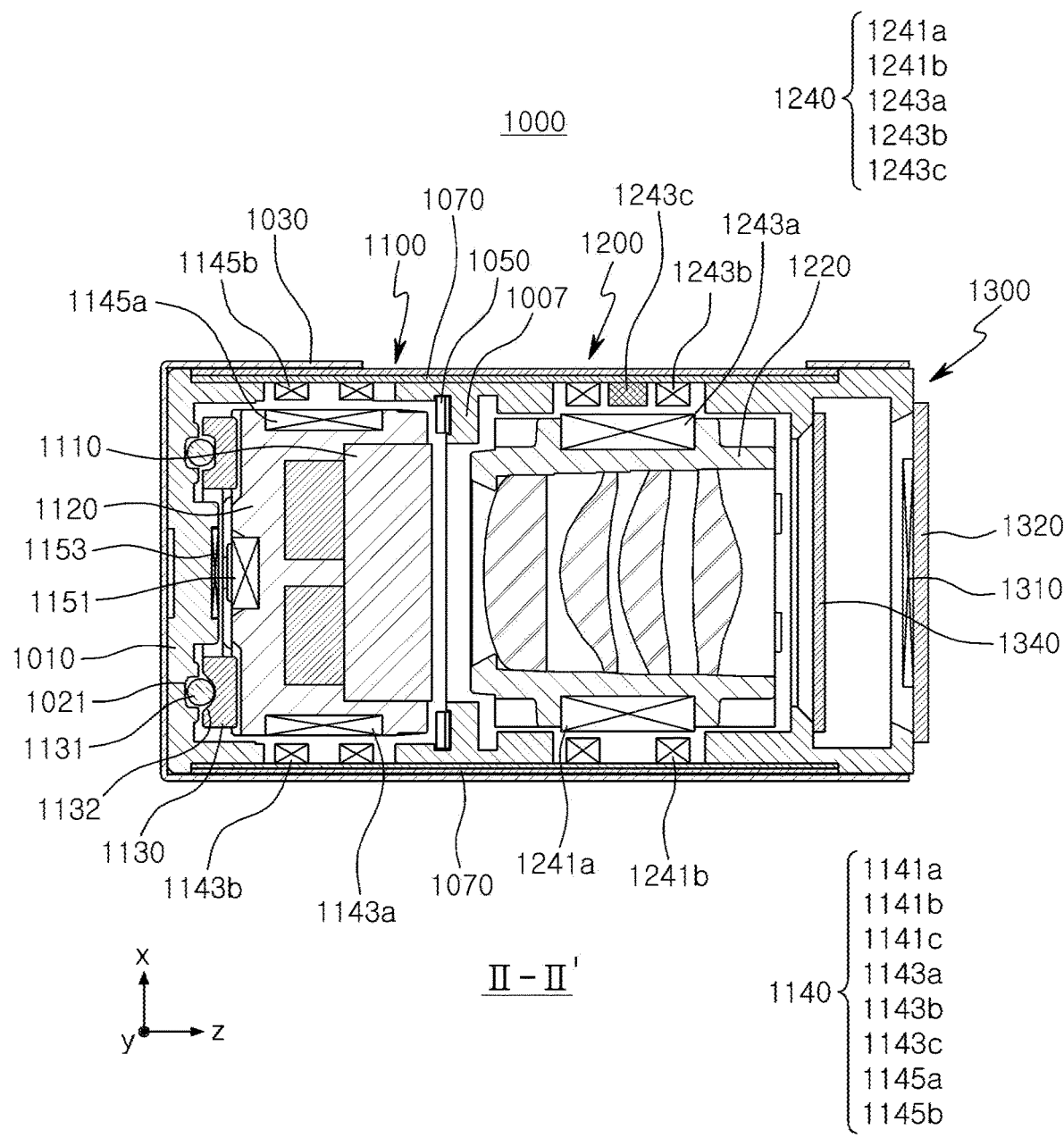
Figure 4:
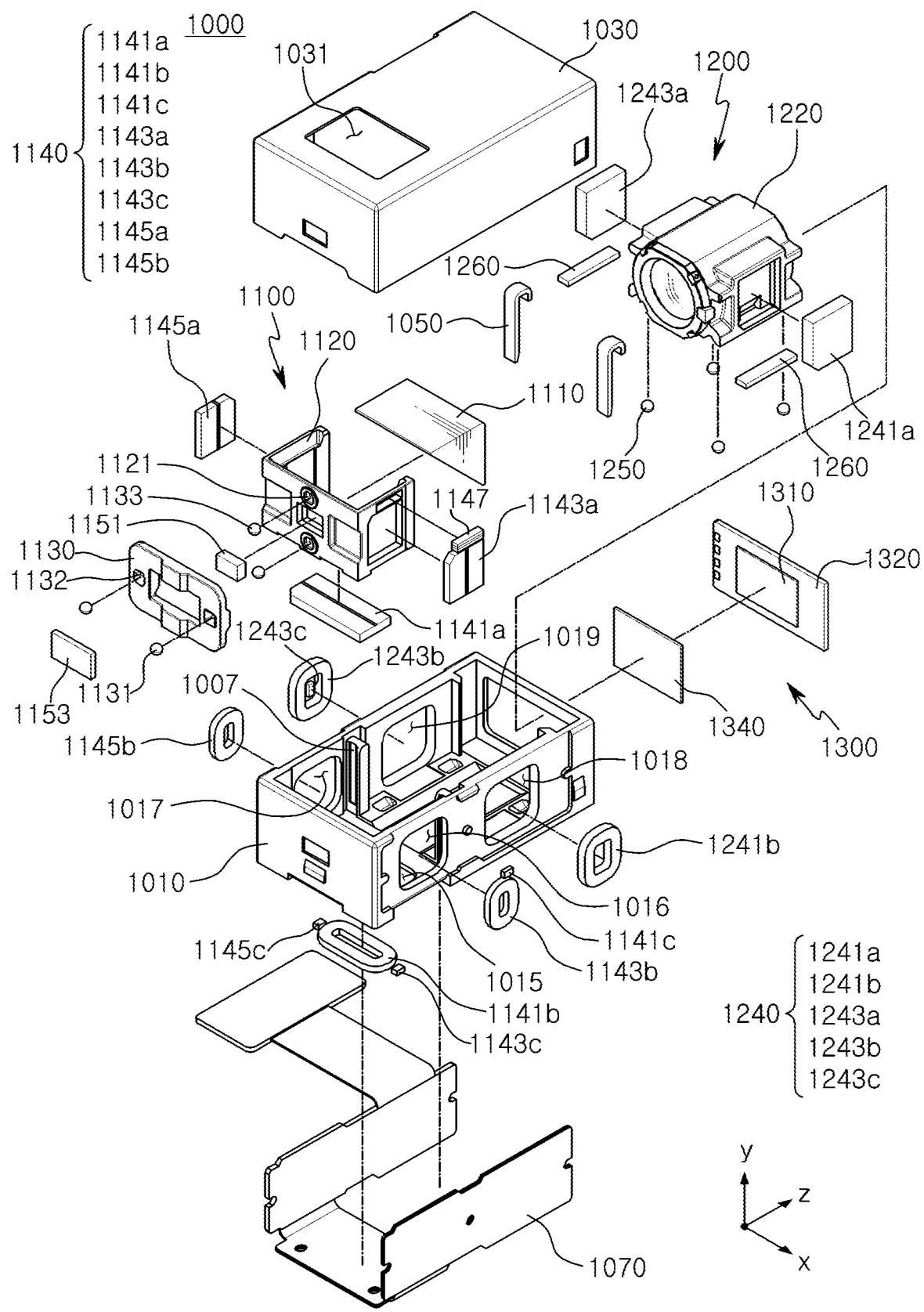
FIG. 4 is an exploded perspective view illustrating a camera module according to an example of the present disclosure.
Figure 5:
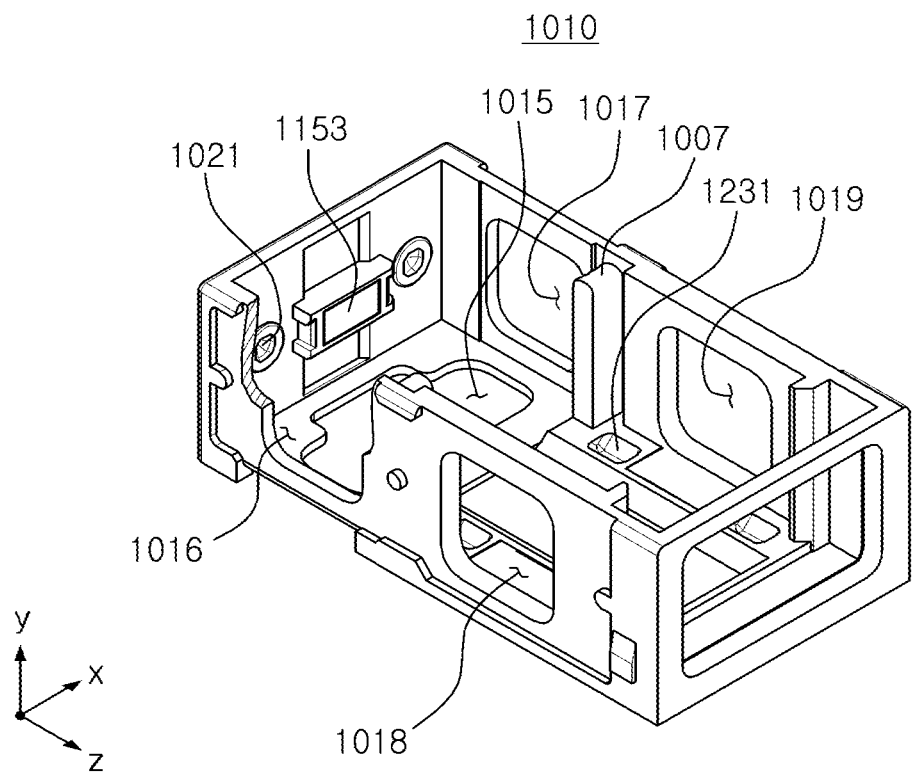
FIG. 5 is a perspective view illustrating a housing of a camera module according to an example of the present disclosure.
Figure 6:
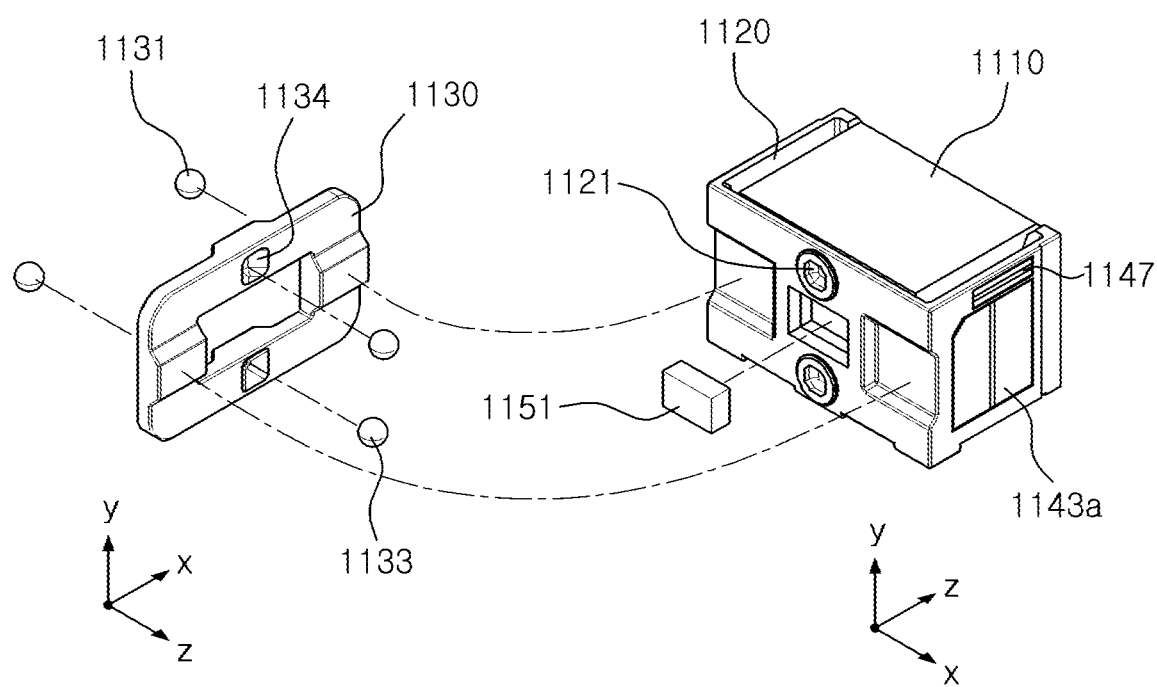
FIG. 6 is an exploded perspective view illustrating a rotation plate and a rotation holder of a camera module according to an example of the present disclosure.
Figure 7:
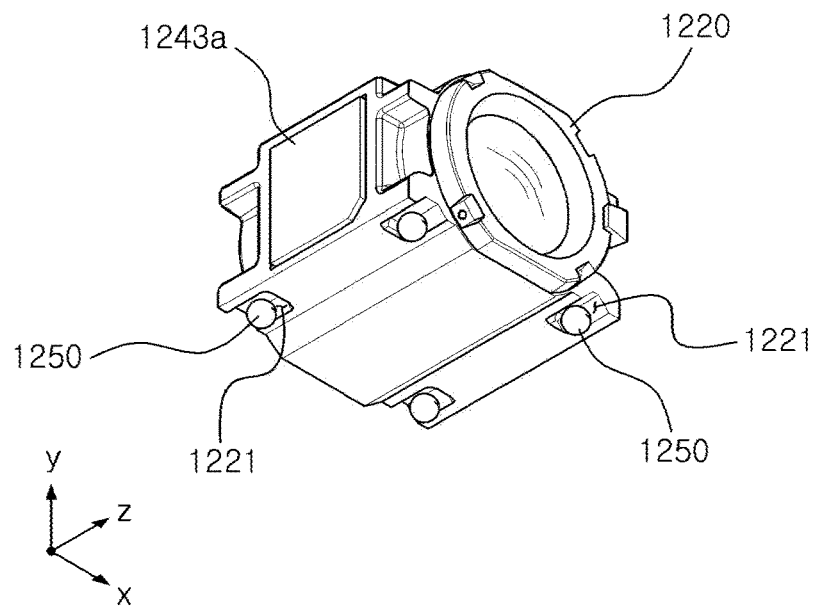
FIG. 7 is a perspective view illustrating a lens holder of a camera module according to an example of the present disclosure.
Figure 8:
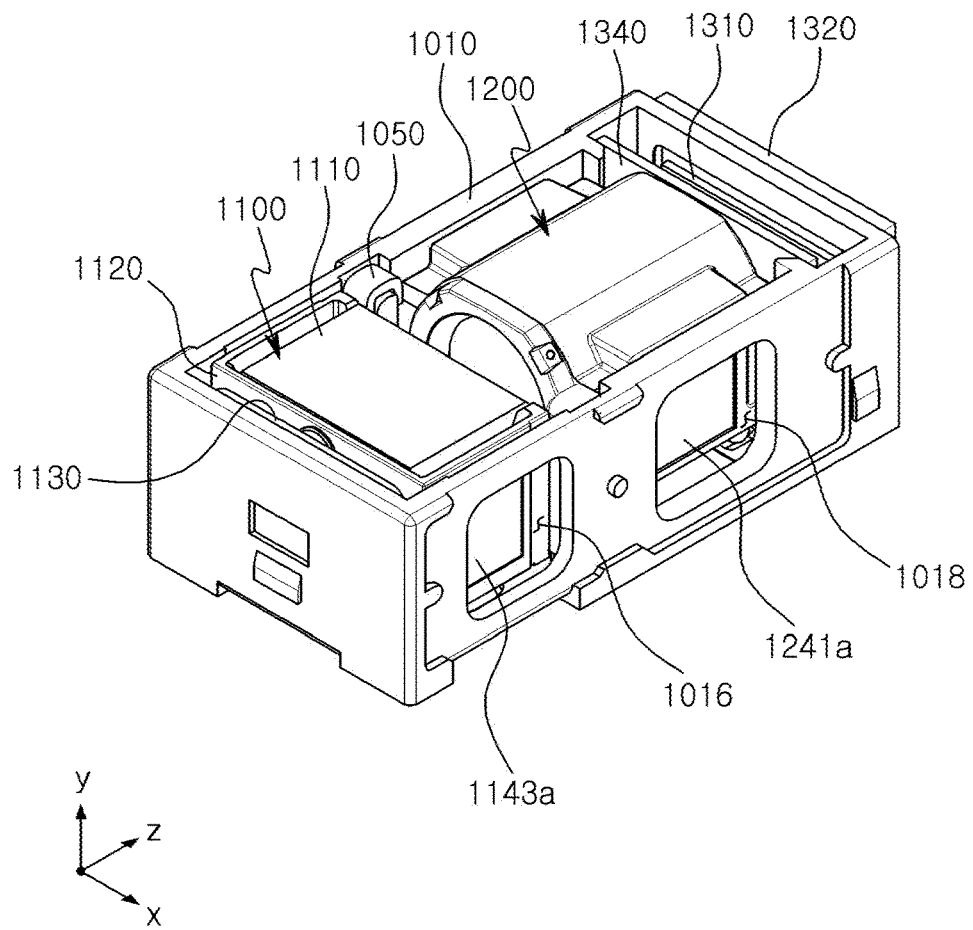
FIG. 8 is an assembled perspective view illustrating components other than a cover in a camera module according to an example of the present disclosure.
Figure 9:
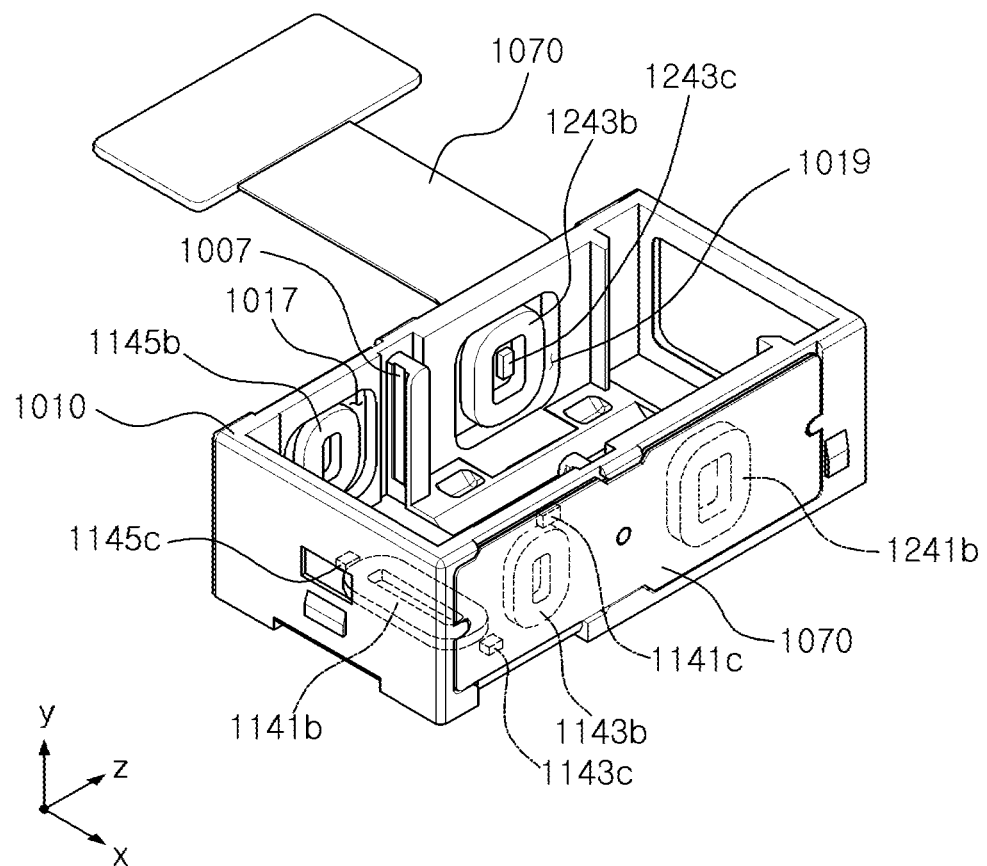
FIG. 9 is an assembled perspective view illustrating a housing and a board in a camera module according to an example of the present disclosure.

FIG. 2 is a perspective view illustrating a camera module according to an example of the present disclosure, and FIGS. 3A and 3B are cross-sectional views illustrating the camera module according to an example of the present disclosure.

Referring to FIGS. 2 to 3B, a camera module 1000 according to an example of the present disclosure may include a reflection module 1100, a lens module 1200, and an image sensor module 1300, provided in a housing 1010.

The reflection module 1100 may be configured to change a moving direction of light. As an example, a moving direction of light incident through an opening portion 1031 (see FIG. 3A) of a cover 1030 covering an upper portion of the camera module 1000 may be changed through the reflection module 1100 such that the light is directed toward the lens module 1200. To this end, the reflection module 1100 may include a reflective member 1110 configured to reflect the light.

A path of the light incident through the opening portion 1031 may be changed by the reflection module 1100 such that the light is directed toward the lens module 1200. For example, a path of light incident in the thickness direction (the Y axis direction) of the camera module 1000 may be changed by the reflection module 1100 to approximately coincide with the optical axis direction (the Z axis direction).

The lens module 1200 may include a plurality of lenses through which the light of which the moving direction is changed by the reflection module 1100 passes, and the image sensor module 1300 may include an image sensor 1310 converting the light passing through the plurality of lenses into an electrical signal and a printed circuit board 1320 on which the image sensor 1310 is mounted. In addition, the image sensor module 1300 may include an optical filter 1340 filtering the light incident from the lens module 1200 thereto. The optical filter 1340 may be an infrared cut-off filter.

In an internal space of the housing 1010, the reflection module 1100 may be provided in front of the lens module 1200, and the image sensor module 1300 may be provided behind the lens module 1200.

Referring to FIGS. 2 to 16, the camera module 1000 according to an example of the present disclosure may include the reflection module 1100, the lens module 1200, and the image sensor module 1300 provided in the housing 1010.

The reflection module 1100, the lens module 1200, and the image sensor module 1300 may be sequentially provided from one side surface of the housing 1010 to the other side thereof in the housing 1010. The housing 1010 may have the internal space into which the reflection module 1100, the lens module 1200, and the image sensor module 1300 are inserted (in this case, the printed circuit board 1320 included in the image sensor module 1300 may be attached to an outer portion of the housing 1010). For example, as illustrated in the drawings, the housing 1010 may be integrally provided such that both of the reflection module 1100 and the lens module 1200 are inserted into the internal space of the housing 1010. However, the housing 1010 is not limited thereto. For example, separate housings into which the reflection module 1100 and the lens module 1200 are inserted, respectively, may also be connected to each other.

In addition, the housing 1010 may be covered by the cover 1030 such that the internal space of the housing 1010 is not visible.

The cover 1030 may have the opening portion 1031 through which light is incident, and a moving direction of the light incident through the opening portion 1031 may be changed by the reflection module 1100, such that the light may be incident to the lens module 1200. The cover 1030 may be integrally provided to cover the entire housing 1010, or may be provided as separate members each covering a respective one of the reflection module 1100 and the lens module 1200.

To this end, the reflection module 1100 may include the reflective member 1110 reflecting the light. In addition, the light incident to the lens module 1200 may pass through the plurality of lenses and may then be converted into and stored as the electrical signal by the image sensor 1310.

The housing 1010 may include the reflection module 1100 and the lens module 1200 disposed in the internal space thereof. Therefore, in the internal space of the housing 1010, a space in which the reflection module 1100 is disposed and a space in which the lens module 1200 is disposed may be distinguished from each other by protruding walls 1007. In addition, the reflection module 1100 may be provided in front of the protruding walls 1007, and the lens module 1200 may be provided behind the protruding walls 1007. The protruding walls 1007 may protrude from opposite sidewalls of the housing 1010 to the internal space.

The reflection module 1100 provided in front of the protruding walls 1007 may have a structure in which a rotation holder 1120 is closely adhered to and supported on an inner wall surface of the housing 1010 by attractive force between a pulling yoke 1153 provided on the inner wall surface of the housing 1010 and a pulling magnet 1151 provided on the rotation holder 1120. In this case, although not illustrated in the drawings, the housing 1010 may also be provided with a pulling magnet, and the rotation holder 1120 may also be provided with a pulling yoke. A structure illustrated in the drawings will hereinafter be described for convenience of explanation.

In this example, the housing 1010 may include stoppers 1050 fitted onto the protruding walls 1007 while supporting the rotation holder 1120 and having a hook shape (even in the case that the stoppers 1050 are not provided, the rotation holder may be fixed to the housing by the attractive force between the pulling magnet 1151 and the pulling yoke 1153). The stoppers 1050 may have the hook shape, and may support the rotation holder 1120 in a state in which hook portions thereof are hooked onto the protruding walls 1007. The stoppers 1050 may be provided, respectively, on the protruding walls 1007 protruding from the opposite sidewalls of the housing. A space may be provided between the stoppers 1050 and the rotation holder 1120 such that the rotation holder 1120 is smoothly rotated.

In addition, the housing 1010 may include a first driving portion 1140 and a second driving portion 1240 provided in order to drive the reflection module 1100 and the lens module 1200, respectively. The first driving portion 1140 may include a plurality of coils 1141b, 1143b, and 1145b for driving the reflection module 1100, and the second driving portion 1240 may include a plurality of coils 1241b and 1243b for driving the lens module 1200. In addition, since the plurality of coils 1141b, 1143b, 1145b, 1241b, and 1243b are provided on the housing 1010 in a state in which they are mounted on a main board 1070, the housing 1010 may be provided with a plurality of through-holes 1015, 1016, 1017, 1018, and 1019 such that the plurality of coils 1141b, 1143b, 1145b, 1241b, and 1243b are exposed to the internal space of the housing 1010.

In this case, the main board 1070 on which the plurality of coils 1141b, 1143b, 1145b, 1241b, and 1243b are mounted may be entirely connected and integrally provided, as illustrated in the drawings. In this case, one terminal may be provided, and connection of an external power supply and signals may thus be easy. However, the main board 1070 is not limited thereto, but may also be provided as a plurality of boards by separating a board on which coils for the reflection module 1100 are mounted and a board on which coils for the lens module 1200 are mounted from each other, or other operations.

The reflection module 1100 may change the path of the light incident thereto through the opening portion 1031. When an image or a moving image is captured, the image may be blurred or the moving image may be shaken due to a hand-shake, or the like, of a user. In this case, the reflection module 1100 may correct the hand-shake, or the like, of the user by moving the rotation holder 1120 on which the reflective member 1110 is mounted. For example, when shaking is generated at the time of capturing the image or the moving image due to the hand-shake, or the like, of the user, a relative displacement corresponding to shaking may be provided to the rotation holder 1120 to compensate for shaking.

In addition, in this example, the OIS function may be implemented by the movement of the rotation holder 1120 having a relatively low weight since it does not include lenses, and the like, and power consumption may thus be significantly reduced.

For example, in this example, the light on which the OIS is performed may be incident to the lens module 1200 by changing the moving direction of the light by the movement of the rotation holder 1120 on which the reflective member 1110 is provided without moving a lens barrel including the plurality of lenses or the image sensor 1310 in order to implement the OIS function.

The reflection module 1100 may include the rotation holder 1120 provided in the housing 1010 to be supported by the housing 1010, the reflective member 1110 mounted on the rotation holder 1120, and the first driving portion 1140 moving the rotation holder 1120.

The reflective member 1110 may change the moving direction of the light. For example, the reflective member 1110 may be a mirror or a prism reflecting the light (a case in which the reflective member 1110 is the prism is illustrated in the drawings associated with an example for convenience of explanation).

The reflective member 1110 may be fixed to the rotation holder 1120. The rotation holder 1120 may have a mounting surface 1123 on which the reflective member 1110 is mounted.

The mounting surface 1123 of the rotation holder 1120 may be an inclined surface such that the path of the light is changed. For example, the mounting surface 1123 may be an inclined surface inclined with respect to the optical axis (the Z axis) of each of the plurality of lenses by 30 to 60°. In addition, the inclined surface of the rotation holder 1120 may be directed toward the opening portion 1031 of the cover 1030 through which the light is incident.

The rotation holder 1120 on which the reflective member 1110 is mounted may be movably accommodated in the internal space of the housing 1010. For example, the rotation holder 1120 may be accommodated in the housing 1010 to be rotatable about a first axis (an X axis) and a second axis (a Y axis). In this case, the first axis (the X axis) and the second axis (the Y axis) refer to axes perpendicular to the optical axis (the Z axis), and may be perpendicular to each other.

The rotation holder 1120 may be supported by the housing 1010 by first ball bearings 1131 aligned along the first axis (the X axis) and second ball bearings 1133 aligned along the second axis (the Y axis) such that it is smoothly rotated about the first axis (the X axis) and the second axis (the Y axis). In the drawings, two first ball bearings 1131 aligned along the first axis (the X axis) and two second ball bearings 1133 aligned along the second axis (the Y axis) are illustrated by way of example. In addition, the rotation holder 1120 may rotate about the first axis (the X axis) and the second axis (the Y axis) by a first driving portion 1140 to be further described below.

In addition, the first ball bearings 1131 and the second ball bearings 1133 may be provided on a front surface and a rear surface of a rotation plate 1130, respectively. Alternatively, the first ball bearings 1131 and the second ball bearings 1133 may be provided on a rear surface and a front surface of the rotation plate 1130, respectively. For example, the first ball bearings 1131 may be aligned along the second axis (the Y axis) and the second ball bearings 1133 may be aligned along the first axis (the X axis), however, a structure illustrated in the drawings will hereinafter be described for convenience of explanation. The rotation plate 1130 may be provided between the rotation holder 1120 and an inner surface of the housing 1010. In addition, the rotation holder 1120 may be supported by the housing 1010 through the rotation plate 1130 (the first ball bearings 1131 and the second ball bearings 1133 may also be provided between the rotation holder 1120 and the housing 1010) by the attractive force between the pulling magnet 1151 (or the pulling yoke) provided on the rotation holder 1120 and the pulling yoke 1153 (or the pulling magnet) provided on the housing 1010.

Seating grooves 1132 and 1134 into which the first ball bearings 1131 and the second ball bearings 1133 are inserted, respectively, may be provided in the front surface and the rear surface of the rotation plate 1130, respectively, and may include first seating grooves 1132 into which the first ball bearings 1131 are partially inserted and second seating grooves 1134 into which the second ball bearings 1133 are partially inserted.

In addition, the housing 1010 may be provided with third seating grooves 1021 into which the first ball bearings 1131 are partially inserted, and the rotation holder 1120 may be provided with fourth seating grooves 1121 into which the second ball bearings 1133 are partially inserted.

The first seating grooves 1132, the second seating grooves 1134, the third seating grooves 1021, and the fourth seating grooves 1121 described above may be provided in a hemispherical or polygonal (poly-prismatic or poly-pyramidal) groove shape such that the first ball bearings 1131 and the second ball bearings 1133 are easily rotated (depths of the seating grooves 1132, 1134, 1021, and 1121 may be smaller than radii thereof in order for the first ball bearings 1131 and the second ball bearings 1133 to be easily rotated. The first ball bearings 1131 and the second ball bearings 1133 are not entirely entered in the seating grooves, but may be partially exposed, such that the rotation plate 1130 and the rotation holder 1120 may be easily rotated. In addition, positions and the numbers of first seating grooves 1132, second seating grooves 1134, third seating grooves 1021, and fourth seating grooves 1121 may correspond to those of first ball bearings 1131 aligned along the first axis (the X axis) and second ball bearings 1133 aligned along the second axis (the Y axis).

In this case, the first ball bearings 1131 and the second ball bearings 1133 may serve as bearings while being rolled or slid in the first seating grooves 1132, the second seating grooves 1134, the third seating grooves 1021, and the fourth seating grooves 1121.

The first ball bearings 1131 and the second ball bearings 1133 may have a structure in which they are fixedly provided in at least one of the housing 1010, the rotation plate 1130, and the rotation holder 1120. For example, the first ball bearings 1131 may be fixedly provided in the housing 1010 or the rotation plate 1130, and the second ball bearings 1133 may be fixedly provided in the rotation plate 1130 or the rotation holder 1120. In this case, only a member facing a member in which the first ball bearings 1131 or the second ball bearings 1133 are fixedly provided may be provided with the seating grooves. In this case, the ball bearings may serve as friction bearings by sliding thereof rather than rotation thereof.

In this case, when the first ball bearings 1131 and the second ball bearings 1133 are fixedly provided in any one of the housing 1010, the rotation plate 1130, and the rotation holder 1120, the first ball bearings 1131 and the second ball bearings 1133 may be provided in a spherical shape or a hemispherical shape (a case in which the first ball bearings 1131 and the second ball bearings 1133 are provided in the hemispherical shape is only an example, and the first ball bearings 1131 and the second ball bearings 1133 may also be provided to have a protruding length greater or smaller than that of a hemisphere). As described herein, a case in which the ball bearings 1131 and 1133 are provided in the cylindrical shapes extended along the first axis (the X axis) and the second axis (the Y axis), respectively, may also be similarly applied.

In addition, the first ball bearings 1131 and the second ball bearings 1133 may be separately manufactured and be then attached to any one of the housing 1010, the rotation plate 1130, and the rotation holder 1120. Alternatively, the first ball bearings 1131 and the second ball bearings 1133 may be provided integrally with the housing 1010, the rotation plate 1130, or the rotation holder 1120 at the time of manufacturing the housing 1010, the rotation plate 1130, or the rotation holder 1120.

The first driving portion 1140 may generate driving force such that the rotation holder 1120 is rotatable about the two axes.

As an example, the first driving portion 1140 may include a plurality of magnets 1141a, 1143a, and 1145a, and a plurality of coils, for example, the plurality of coils 1141b, 1143b, and 1145b disposed to face the plurality of magnets 1141a, 1143a, and 1145a.

When power is applied to the plurality of coils 1141b, 1143b, and 1145b, the rotation holder 1120 on which the plurality of magnets 1141a, 1143a, and 1145a are mounted may rotate about the first axis (the X axis) and the second axis (the Y axis) by electromagnetic interaction between the plurality of magnets 1141a, 1143a, and 1145a and the plurality of coils 1141b, 1143b, and 1145b.

The plurality of magnets 1141a, 1143a, and 1145a may be mounted on the rotation holder 1120. As an example, some 1141a of the plurality of magnets 1141a, 1143a, and 1145a may be mounted on a lower surface of the rotation holder 1120, and the others 1143a and 1145a of the plurality of magnets 1141a, 1143a, and 1145a may be mounted on side surfaces of the rotation holder 1120.

The plurality of coils 1141b, 1143b, and 1145b may be mounted on the housing 1010. As an example, the plurality of coils 1141b, 1143b, and 1145b may be mounted on the housing 1010 through the main board 1070. For example, the plurality of coils 1141b, 1143b, and 1145b may be provided on the main board 1070, and the main board 1070 may be mounted on the housing 1010. In this case, an example in which the main board 1070 is entirely integrally provided such that both of the coils for the reflection module 1100 and the coils for the lens module 1200 are mounted thereon is illustrated in the drawings, but the main board 1070 may be provided as two or more separate boards on which the coils for the reflection module 1100 and the coils for the lens module 1200 are mounted, respectively.

A reinforcing plate (not illustrated) may be mounted below the main board 1070 in order to reinforce strength of the main board.

In this example, when the rotation holder 1120 is rotated, a closed loop control manner of sensing and feeding back a position of the rotation holder 1120 may be used.

Therefore, position detection sensors 1141c and 1143c may be required in order to perform a closed loop control. The position detection sensors 1141c and 1143c may be Hall sensors.

The position detection sensors 1141c and 1143c may be disposed outside the coils 1141b and 1143b, respectively, and may be mounted on the main board 1070 on which the coils 1141b and 1143b are mounted.

The main board 1070 may be provided with a gyro sensor (not illustrated) sensing shaking factor such as the handshake, or the like, of the user, and may be provided with a driver integrated circuit (IC) (not illustrated) providing driving signals to the plurality of coils 1141b, 1143b, and 1145b.

The examples described herein may minimize influence of a current applied to a coil, minimize deterioration in position sensing accuracy, even when a position of a driving magnet is slightly shifted by assembly tolerance or external impact, and provide a camera module, including a Hall sensor, capable of increasing sensing sensitivity according to a relative position with a magnet to increase a degree of sensing accuracy.

For example, the first to fourth seating grooves 1132, 1134, 1021, and 1121 may be pressed by the ball bearings 1131 and 1133 by external impact or repeated use. In this case, the position of the rotation holder 1120 may be changed in the optical axis (the Z axis) direction. Therefore, even when the positions of the driving magnets 1141a, 1143a, and 1145a are slightly shifted according to the change of the rotation holder 1120 in the optical axis direction, a structure capable of maintaining the sensing accuracy of the Hall sensors 1141c and 1143c to the maximum is required.

Therefore, an example in which the relative positions of the Hall sensors 1141c and 1143c and the magnets 1141a, 1143a, and 1145a are optimized in consideration of various environmental factors will be provided, with reference to FIGS. 10 to 15.

Figure 10:
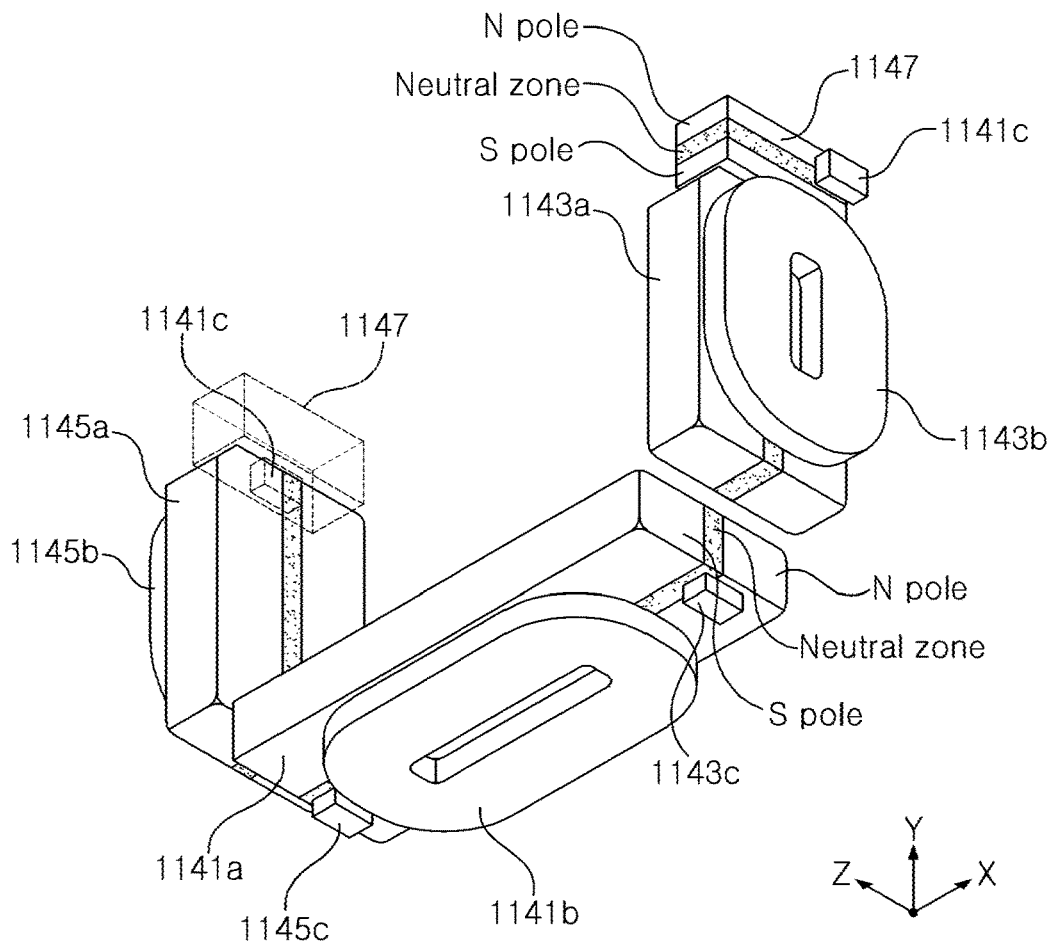
FIG. 10 is a perspective view illustrating a positional relationship between an OIS coil, a magnet, a sensing magnet, and a Hall sensor according to an example of the present disclosure.

First, referring to FIG. 10, a positional relationship between an OIS coil, a driving magnet, a sensing magnet, and a position detection sensor according to an example of the present disclosure may be illustrated.

Prior to the detailed description, sensing of a position according to the X axis or Y axis movement of a rotation holder 1120 according to this example may be implemented by the position detection sensor (for example, a Hall sensor). When the position detection sensor is inside a coiled portion of the coil, the position detection sensor may be affected by electromagnetic force between the coil and the magnet.

Therefore, the position detection sensor may be provided outside the coiled portion of the coil.

In addition, this example may include a first sensing magnet 1147 provided separately from the driving magnet, to more accurately sense the position, when the rotation holder 1120 rotates about the first axis (the X axis). The present disclosure is not limited thereto, and the sensing magnet described below may be a driving magnet of the rotation holder related to driving of the rotation holder.

Referring to FIGS. 10 to 12B, the rotation holder 1120 may include, for example, first to third driving magnets 1141a, 1143a, and 1145a, and may include first to third driving coils 1141b, 1143b, and 1145b to face the first to third driving magnets 1141a, 1143a, and 1145a. In this case, the first driving magnet 1141a and the first driving coil 1141b allow the rotation holder 1120 to be rotatable about the first axis (the X axis), and the second and third driving magnets 1143a and 1145a and the second and third driving coils 1143b and 1145b allow the rotation holder 1120 to be rotatable about the second axis (the Y axis).

In addition, when the rotation holder 1120 is rotated about the first axis (the X axis), for example, when the rotation holder 1120 moves in the Y axis direction, a first position detection sensor 1141c may be provided to sense a position of the rotation holder 1120, and the first position detection sensor 1141c may detect a change in position of the first sensing magnet 1147 provided in the rotation holder 1120.

The first sensing magnet 1147 may be installed in a space in which the first position detection sensor 1141c may detect the movement, when the rotation holder 1120 rotates about the first axis (the X axis). In this example, the first sensing magnet 1147 may be provided on a side surface of the rotation holder 1120, which may be a surface intersecting in the X axis direction, in consideration of space utilization and sensitivity. In addition, the first sensing magnet 1147 may be fixed in a position adjacent to the second driving magnet 1143a provided on the side surface of the rotation holder 1120.

In this case, the installation position of the first sensing magnet 1147 is not particularly limited, but the first sensing magnet 1147 may be installed in a space in which movement in the second axis (the Y axis) direction may be the greatest, when the rotation holder 1120 rotates about the first axis (the X axis). In this example, the rotation holder 1120 may rotate about a rotation axis formed parallel to the first axis (the X axis) direction between an inner wall of the housing 1010 and the rotation plate 1130, such that a position in which movement of the rotation holder 1120 is the greatest may be furthest from the inner wall of the housing 1010 in the optical axis direction (the Z axis direction), for example, closest to the lens module 1200. Therefore, in this example, the first sensing magnet 1147 may be installed to be biased toward a position of the rotation holder 1120, closest to the lens module 1200 in the optical axis direction (to be farthest from the inner wall of the housing 1010 on which the rotation holder 1120 is supported in the optical axis direction). Further, the first position detection sensor 1141c may be installed to face a position maximally biased toward the lens module 1200 in the optical axis direction, opposite to the first sensing magnet 1147, for example, a position maximally biased toward the lens module 1200 in the optical axis direction among the first sensing magnets 1147.

The first sensing magnet 1147 may be a two-pole magnetized with two poles, and an N pole, a neutral zone, and an S pole may be sequentially arranged in the Y axis direction in which the rotation holder 1120 moves. For example, stacking directions of the N pole, the neutral zone, and the S pole of the first sensing magnet 1147 may be parallel to the Y axis direction.

Therefore, the magnetized poles (the S and N poles) and the neutral zone of the first sensing magnet 1147 may be elongated in the Z axis direction.

The first position detection sensor 1141c may be provided on the same plane side by side surface of the second driving coil 1143b. Therefore, the first position detection sensor 1141c may be mounted on a main board 1070, together with the second driving coil 1143b, to be exposed internally through a through-hole 1016 provided on a side surface of the housing 1010.

The first position detection sensor 1141c may face the first sensing magnet 1147, for example, the first position detection sensor 1141c may be aligned to face an intermediate point in which the N pole and the S pole of the first sensing magnet 1147 magnetized with the two poles meet, when the rotation holder 1120 is in a non-driven state. In addition, the first sensing magnet 1147 may include a neutral zone between the N pole and the S pole, and in this case, the first position detection sensor 1141c may be aligned to face approximately a center of the neutral zone of the first sensing magnet 1147 magnetized with the two poles, when the rotation holder 1120 is in a non-driven state.

In addition, in the detailed description, the first position detection sensor 1141c and the first sensing magnet 1147 provided on only one side surface of the rotation holder 1120 are mainly described. As illustrated by a dotted line in FIG. 10, the first position detection sensor 1141c and the first sensing magnet 1147 may be provided on both side surfaces of the rotation holder 1120. For example, the first position detection sensor 1141c and the first sensing magnet 1147 may be provided on one side surface or both side surfaces of the rotation holder 1120.

Figure 12A:
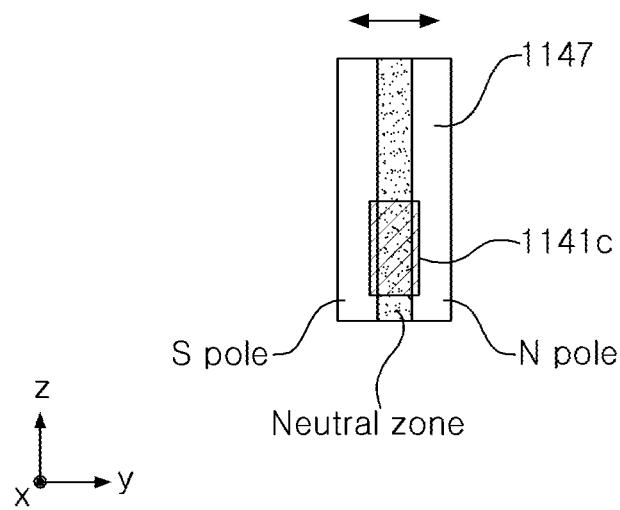
FIG. 12A is a reference view illustrating a positional relationship between the driving magnet used in FIG. 11 to rotate a rotation holder 1120 about a Y axis and the position detection sensor used in FIG. 11 to sense a position thereof.
Figure 12B:
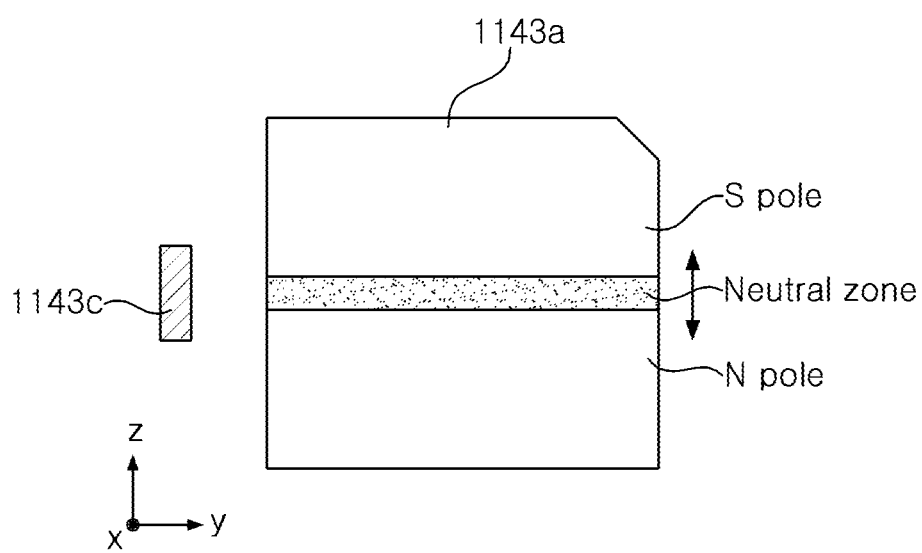
FIG. 12B is a reference view illustrating a positional relationship between the sensing magnet used in FIG. 11 to rotate a rotation holder 1120 about an X axis and the position detection sensor used in FIG. 11 to sense a position thereof.

Next, referring to FIG. 10 and FIG. 12B, when the rotation holder 1120 is rotated about the second axis (the Y axis), for example, when the rotation holder 1120 moves in the X axis direction, a second position detection sensor 1143c may be provided to sense a position of the rotation holder 1120. In this case, the second position detection sensor 1143c may detect a change in position of the second driving magnet 1143a provided in the rotation holder 1120.

The second position detection sensor 1143c may be installed in a space in which the second position detection sensor 1143c may detect the movement, when the rotation holder 1120 rotates about the second axis (the Y axis). In this example, the second position detection sensor 1143c may be installed on the bottom of the housing 1010 in order to utilize a space according to the installation of the first sensing magnet 1147 and the first position detection sensor 1141c. In addition, the second position detection sensor 1143c may detect a change in position of the second driving magnet 1143a provided on the side surface of the rotation holder 1120.

The second driving magnet 1143a may be a two-pole magnetized with two poles, and an N pole, a neutral zone, and an S pole may be sequentially arranged in the Z axis direction in which the rotation holder 1120 moves. For example, stacking directions of the N pole, the neutral zone, and the S pole of the second driving magnet 1143a may be parallel to the Z axis direction.

Therefore, the magnetized poles (the S and N poles) and the neutral zone of the second driving magnet 1143a may be elongated in the Y axis direction.

The second position detection sensor 1143c may be provided beside the first driving coil 1141b. Therefore, the second position detection sensor 1143c may be mounted on the main board 1070, together with the first driving coil 1141*b*, to be exposed internally through a through-hole 1015 provided on the bottom of the housing 1010, to an internal space of the housing 1010.

The second position detection sensor 1143*c* may face the second driving magnet 1143*a*, and more specifically, the second position detection sensor 1143*c* may be arranged to be aligned with the neutral zone of the second driving magnet 1143*a* magnetized with the two poles (when the rotation holder 1120 is in a non-driven state).

In addition, in this example, the second driving magnet 1143*a* provided on one side surface of the rotation holder 1120 and the second position detection sensor 1143*c* provided on the bottom surface of the housing 1010, to face the same is mainly described. In addition, in this example, a structure in which a third driving magnet 1145*a* is provided on the other side surface of the rotation holder 1120 (opposite to one side surface thereof), and a third position detection sensor 1145*c* is provided on the bottom surface of the housing 1010, to sense a position of the rotation holder 1120 by the third position detection sensor 1145*c* and the third driving magnet 1145*a*, may be further included. A positional relationship of the third position detection sensor 1145*c* and the third driving magnet 1145*a*, individual structures thereof, and characteristics thereof may be the same as those of the second position detection sensor 1143*c* and the second driving magnet 1143*a*.

Further, the second position detection sensor 1143*c* and the third position detection sensor 1145*c* may be respectively disposed in both end directions of the first driving coil 1141*b*. The second position detection sensor 1143*c* and the third position detection sensor 1145*c* may be arranged to be aligned with the neutral zone of the first driving magnet 1141*a* (e.g., the first driving magnet 1141*a* may be a magnet magnetized with the two poles, and may have a structure in which an N pole, a neutral zone, and an S pole are sequentially arranged) when the rotation holder 1120 is in a non-driven state.

In addition, the second position detection sensor 1143*c* and the third position detection sensor 1145*c* may be mounted on the main board 1070 in a state in which the second position detection sensor 1143*c* and the third position detection sensor 1145*c* may be respectively disposed in both end directions of the first driving coil 1141*b*, to be exposed to the internal space of the housing 1010 through the through-hole 1015 provided on the bottom of the housing 1010.

Figure 11:
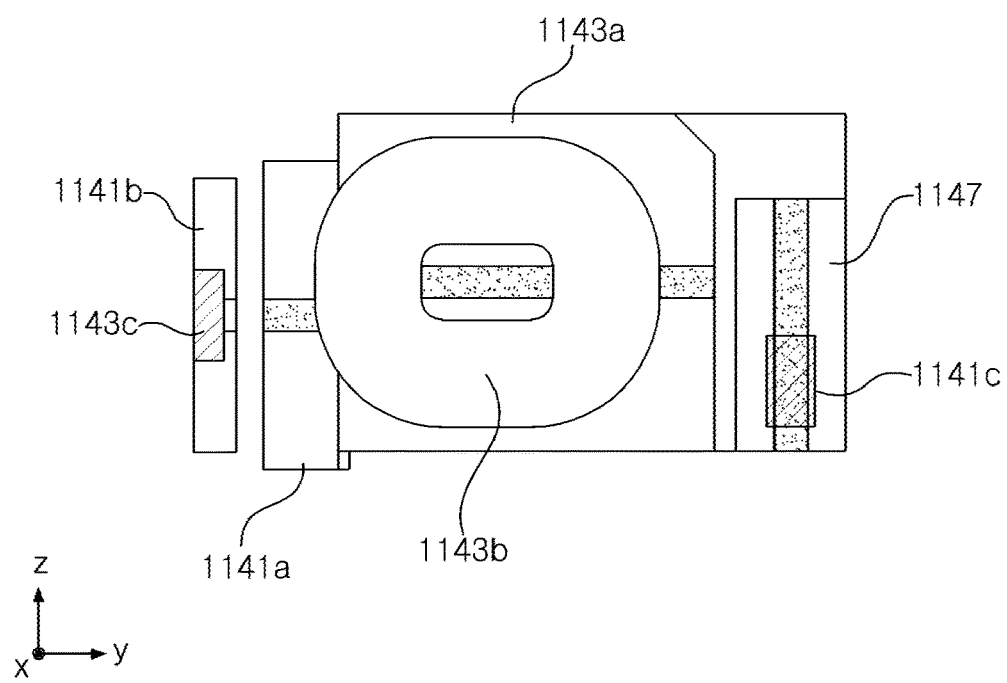
FIG. 11 is a side view of the arrangement of FIG. 10, viewed in an X axis direction.

Since the position sensing structure according to the example, illustrated in FIG. 11, has to be provided in a relatively small size as an installation space of the first sensing magnet 1147 in the rotation holder 1120 is relatively narrow, sensitivity for interaction with the first position detection sensor 1141*c* may be relatively weak (the second driving magnet 1143*a* or the third driving magnet 1145*a* should be installed on the side surface of the rotation holder 1120).

Figure 13:
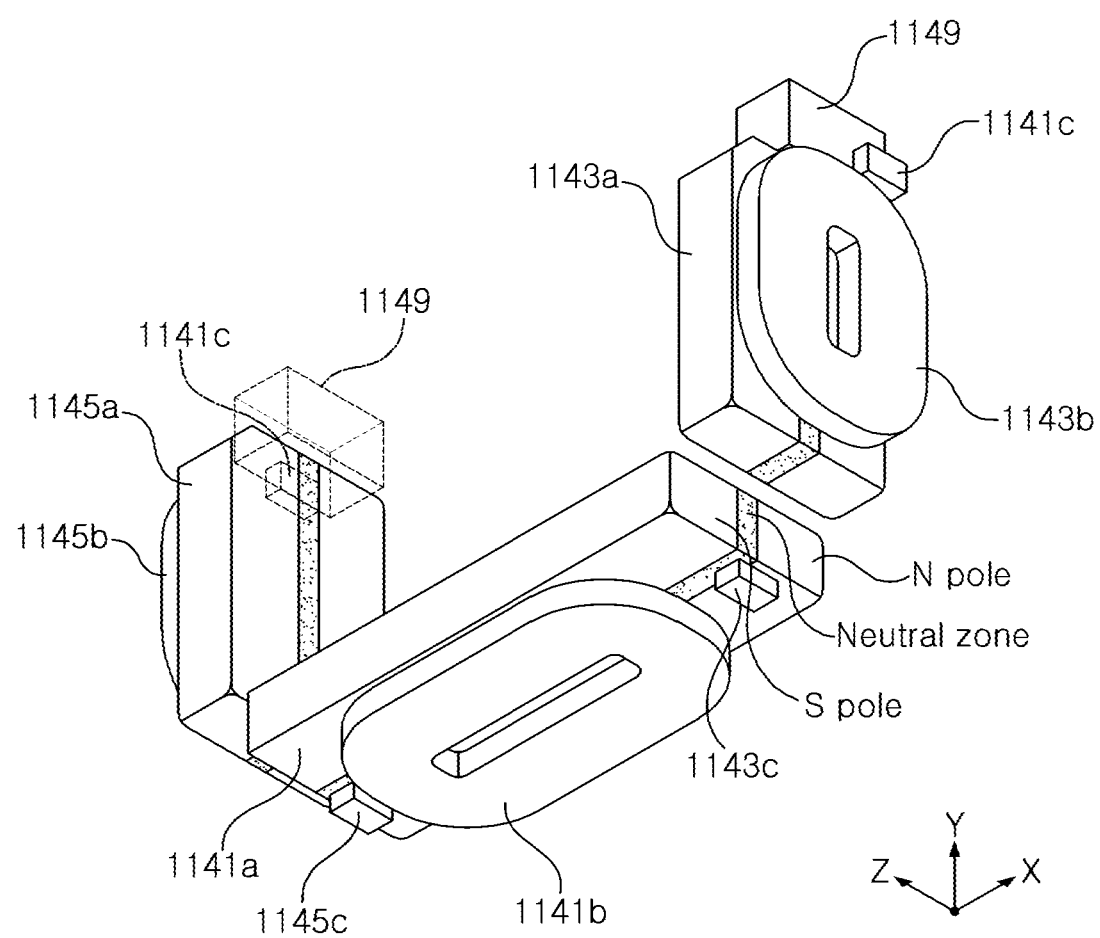
FIG. 13 is a perspective view illustrating a positional relationship between an OIS coil, a magnet, a sensing magnet, and a Hall sensor according to another example of the present disclosure.

Therefore, as illustrated in FIGS. 13 to 15B, in a position sensing structure according to another example, a second sensing magnet 1149 may be provided as a single-pole magnet magnetized with a single pole (the entire magnet is magnetized in only one direction, and for convenience, the polarity may be referred to as an S pole or an N pole, depending on a direction to be magnetized), and a portion of polarities of the second driving magnet 1143*a*, which may be adjacently installed, may be used for position sensing (other examples may use the third driving magnet 1145*a* in the same manner to implement position sensing together with a sensing magnet additionally provided, for example, a portion indicated by a dotted line in FIG. 13, and it may be explained with a structure in which the second driving magnet 1143*a* is used to implement the position sensing, for convenience of description).

For example, as the rotation holder 1120 moves in the Y axis direction, the first position sensing sensor 1141*c* may sense the position of one polarity of the second sensing magnet 1149 and the second driving magnet 1143*a*, to detect more accurately a position of the rotation holder 1120.

The position sensing structure according to another example disclosed in FIGS. 13 to 15B may be the same as the structure and method using the second position detection sensor 1143*c* and the second driving magnet 1143*a*, when the rotation holder 1120 is rotated about the second axis (the Y axis) (e.g., when the rotation holder 1120 moves in the X axis direction), in the example described with reference to FIGS. 10 to 12B, and thus further detailed description thereof will be omitted.

Referring to FIGS. 13 to 15B, when the rotation holder 1120 is rotated about the first axis (the X axis) (e.g., when the rotation holder 1120 moves in the Y axis direction), the first position detection sensor 1141*c* may be provided to sense a position of the rotation holder 1120. In this case, the first position detection sensor 1141*c* may detect a change in position of the second sensing magnet 1149 and the second driving magnet 1143*a* provided in the rotation holder 1120.

The second sensing magnet 1149 may be installed in a space in which the rotation holder 1120 may detect the movement, together with the second driving magnet 1143*a*, when the rotation holder 1120 rotates about the first axis (the X axis). In this example, the second sensing magnet 1149 may be provided on a side surface of the rotation holder 1120, which may be a surface intersecting in the X axis direction and may be provided with the second driving magnet 1143*a*, in consideration of space utilization and sensitivity. In addition, the second sensing magnet 1149 may be fixed in a position adjacent to the second driving magnet 1143*a* provided on the side surface of the rotation holder 1120.

In this case, the installation position of the second sensing magnet 1149 is not particularly limited, but the second sensing magnet 1149 may be installed in a space in which movement in the second axis (the Y axis) direction may be the greatest, when the rotation holder 1120 rotates about the first axis (the X axis). In this example, the rotation holder 1120 may rotate about a rotation axis formed parallel to the first axis (the X axis) direction between an inner wall of a housing 1010 and a rotation plate 1130, such that a position in which movement of the rotation holder 1120 is the greatest may be furthest from the inner wall of the housing 1010 in the optical axis direction (the Z axis direction), for example, closest to a lens module 1200. Therefore, in this example, the second sensing magnet 1149 may be installed to be biased toward a position of the rotation holder 1120, closest to the lens module 1200 in the optical axis direction (to be farthest from the inner wall of the housing 1010 on which the rotation holder 1120 is supported in the optical axis direction). Further, the first position detection sensor 1141*c* may be installed to face a position maximally biased toward the lens module 1200 in the optical axis direction, opposite to the second sensing magnet 1149, for example, a position maximally biased toward the lens module 1200 in the optical axis direction among the second sensing magnets 1149.

The second sensing magnet 1149 may be a single-pole magnet magnetized with a single pole, and may be disposed to be biased toward a polarity, opposite to that of the second sensing magnet 1149, when the second sensing magnet 1149 is disposed next to the second driving magnet 1143*a*.

In addition, the second sensing magnet 1149 and the second driving magnet 1143*a* may be sequentially arranged in the Y axis direction at a slight interval. Therefore, an N pole, a neutral zone, and an S pole may be sequentially arranged in the Y axis direction, which may be a direction in which the rotation holder 1120 moves, due to the second sensing magnet 1149, the second driving magnet 1143*a*, and the interval therebetween. In addition, the first position detection sensor 1141*c* may be disposed to face the neutral zone formed between the second sensing magnet 1149 and the second driving magnet 1143*a* (FIGS. 14A and 15A).

Alternatively, the second sensing magnet 1149 and the second driving magnet 1143*a* may be sequentially arranged in the Y axis direction, to be in close contact with each other without an interval. Therefore, the N pole and the S pole may be sequentially implemented by the second sensing magnet 1149 and the second driving magnet 1143*a* in the Y axis direction, which may be a direction in which the rotation holder 1120 moves. In addition, the first position detection sensor 1141*c* may be disposed to face approximately halfway between the second sensing magnet 1149 and the second driving magnet 1143*a* (FIGS. 14B and 15B).

The second driving magnet 1143*a* may be a two-pole magnet sequentially magnetized with two poles in the optical axis (the Z axis) direction (e.g., magnetized in different directions to be magnetized, and for convenience, the polarity may be referred to as an S pole or an N pole, depending on a direction to be magnetized, and a zone therebetween may be referred to as a neutral zone), such that the second sensing magnet 1149 may be disposed to face the second driving magnet 1143*a*, to be biased in an upward or downward direction in the Z axis direction. Polarity (magnetization direction) of the second sensing magnet 1149 may also be changed, depending on the polarity of the second driving magnet 1431*a*.

Figure 14A:
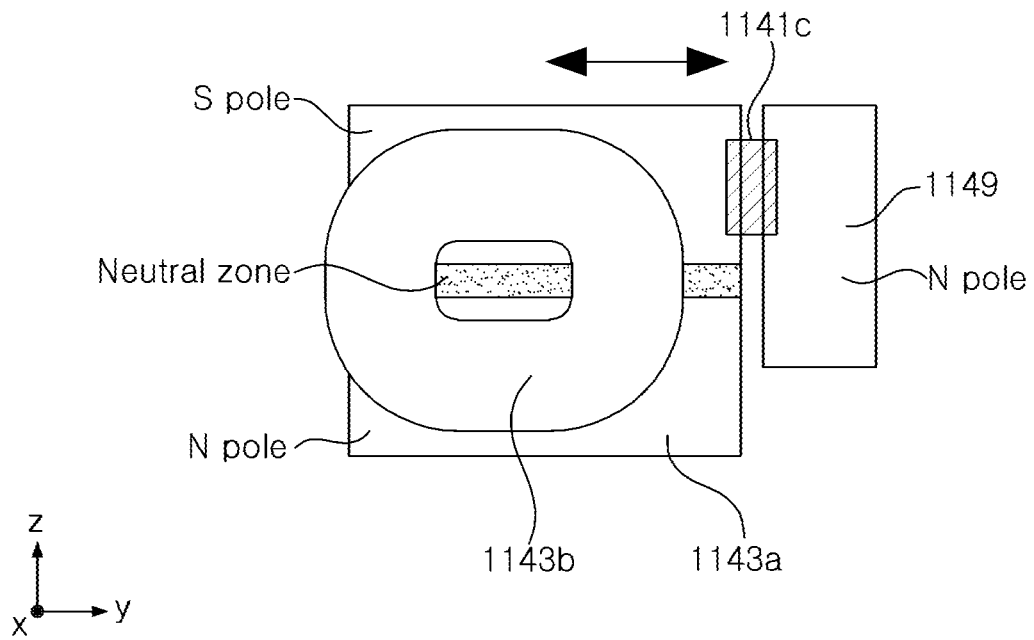
FIGS. 14A to 15B are side views illustrating the arrangement of FIG. 13 in an X axis direction, and reference views illustrating a positional relationship between a sensing magnet used to rotate a rotation holder 1120 about an X axis and a position detection sensor used to sense a position thereof.
Figure 14B:
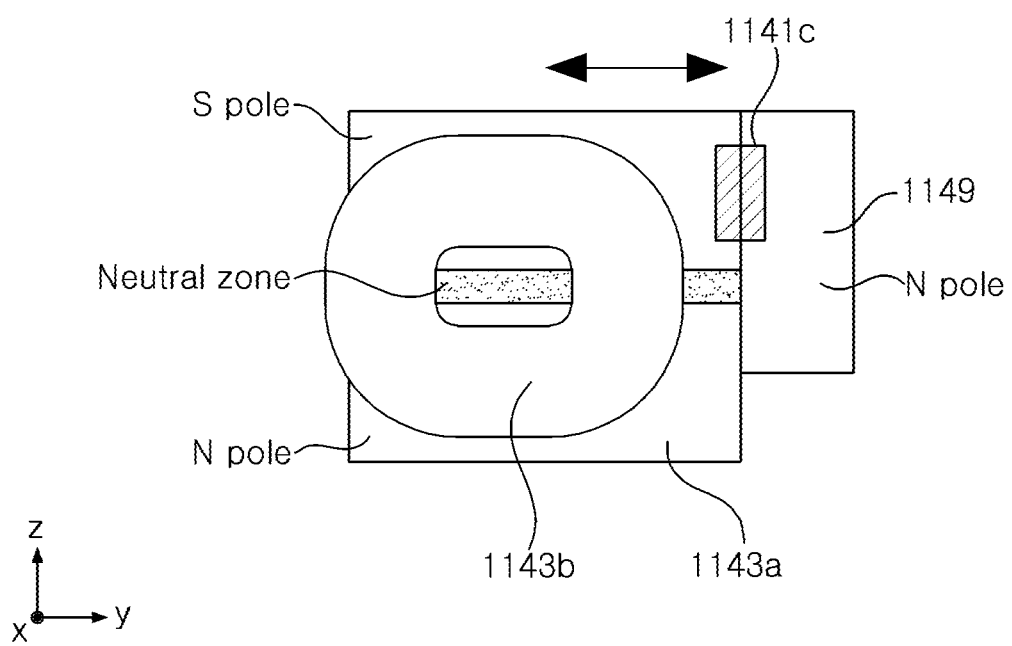
Figure 15A:
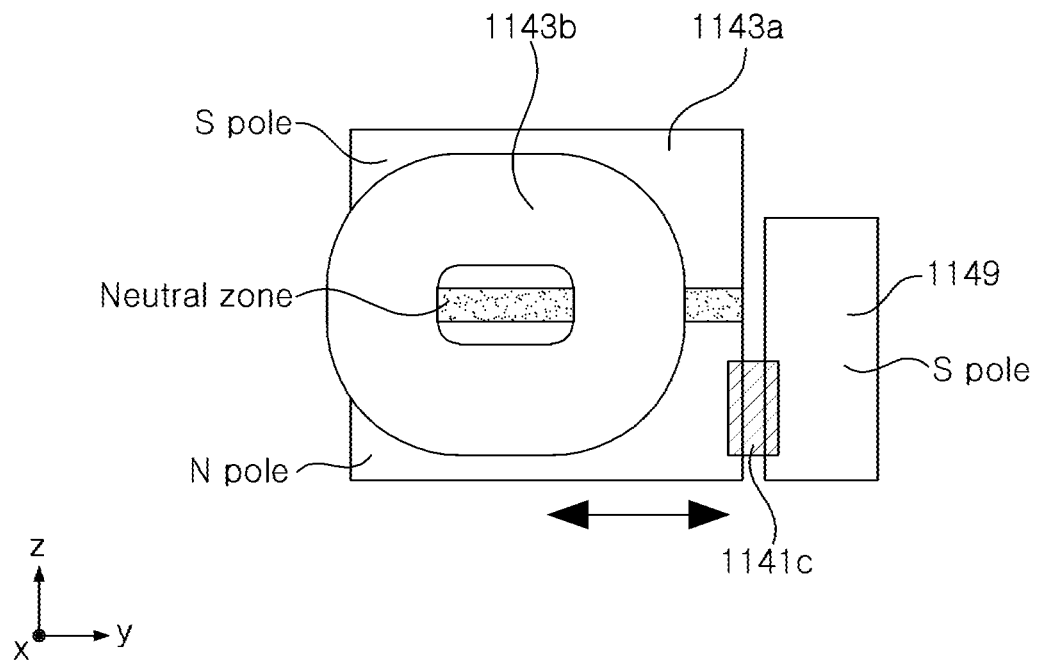
Figure 15B:
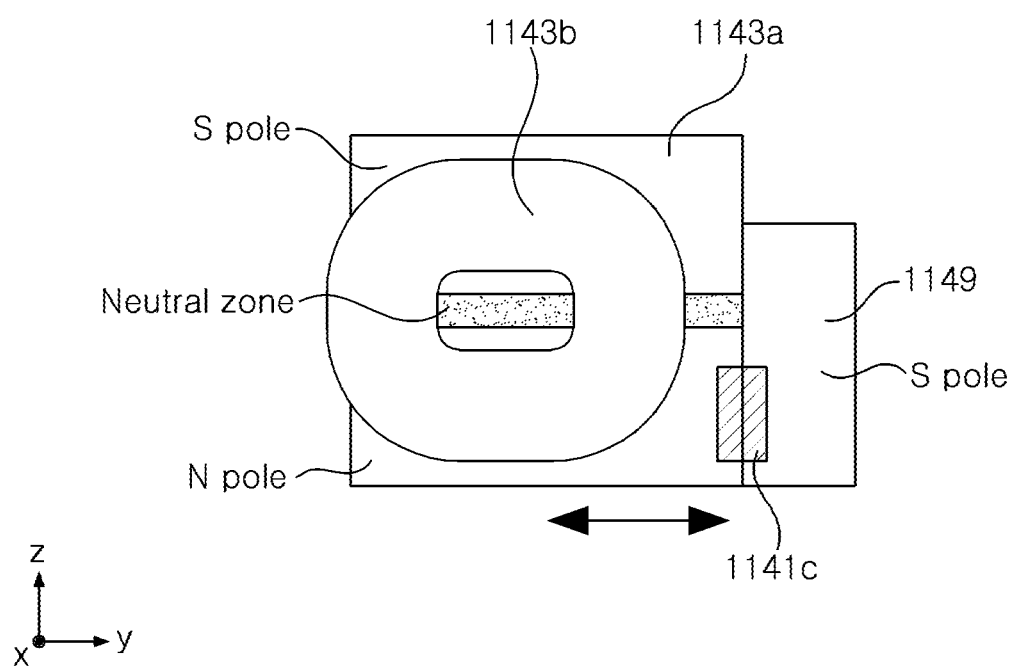
Figure 16:
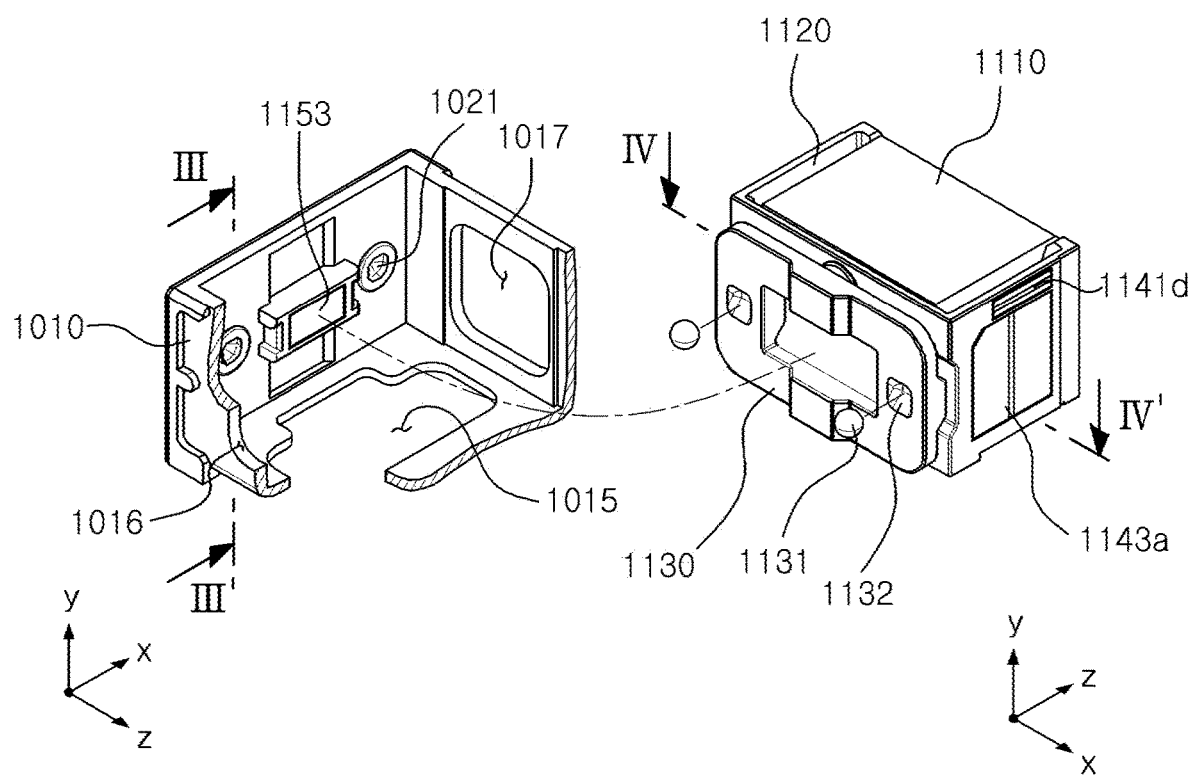
FIG. 16 is an exploded perspective view illustrating a housing and a rotation holder in a camera module according to an example of the present disclosure.

For example, when the second sensing magnet 1149 is biased toward and faces the S pole of the second driving magnet 1143*a*, as illustrated in FIGS. 14A and 14B, the second sensing magnet 1149 may be magnetized to the N pole. When the second sensing magnet 1149 is biased toward and faces the N pole of the second driving magnet 1143*a*, as illustrated in FIGS. 15A and 15B, the second sensing magnet 1149 may be magnetized to the S pole. The first position detection sensor 1141*c* may be disposed to be biased toward one side or the other side between the second sensing magnet 1149 and the second driving magnet 1143*a* in the Z axis direction, according to the position of the second sensing magnet 1149, as illustrated in FIGS. 14A to 15B. Further, the second sensing magnet 1149 and the second driving magnet 1143*a* may be arranged at a predetermined interval to form a neutral zone therebetween, as illustrated in FIGS. 14A and 15A, or may be arranged in close contact with each other, as illustrated in FIGS. 14B and 15B.

The first position detection sensor 1141*c* may be provided next to the second driving coil 1143*b*. Therefore, the first position detection sensor 1141*c* may be mounted on the main board 1070, together with the second driving coil 1143*b*, to be exposed internally through the through-hole 1016 provided on the side surface of the housing 1010.

In the drawings, only the first position detection sensor 1141*c* and the second sensing magnet 1149 are illustrated to be provided on only one side surface of the rotation holder 1120, but they may be provided on the other side surface of the rotation holder 1120. In this case, the first position detection sensor 1141*c* may use the second sensing magnet 1149 and the third driving magnet 1145*a* to sense a position of the rotation holder 1120 in the Y axis direction.

Figure 17A:
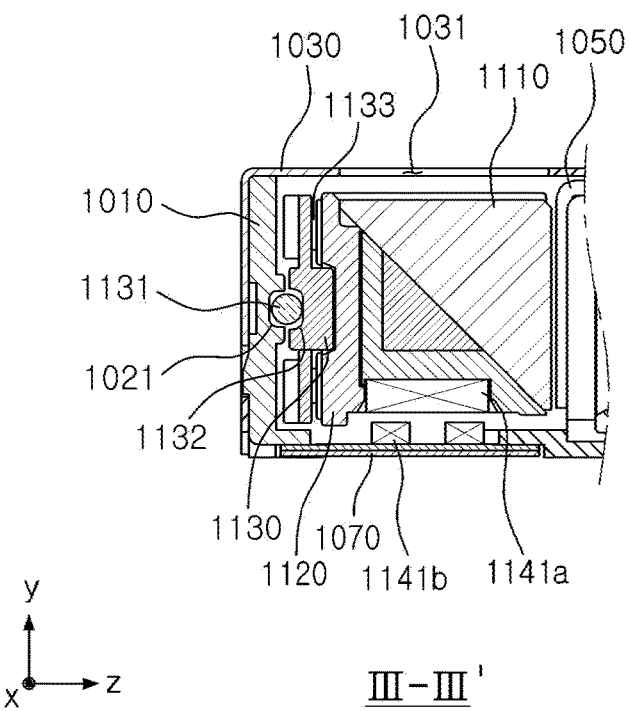
FIGS. 17A to 17C are views schematically illustrating how a rotation holder rotates about a first axis (an X axis) according to an example of the present disclosure.
Figure 17B:
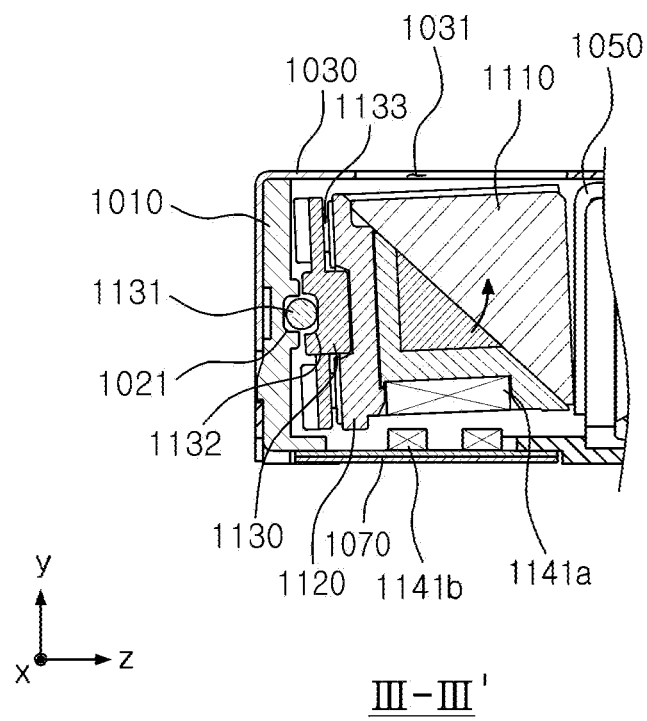
Figure 17C:
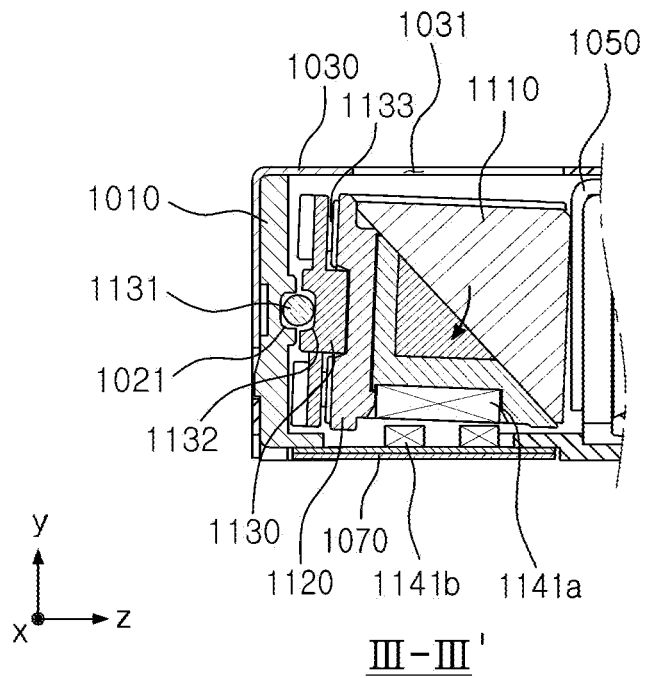
Figure 18A:
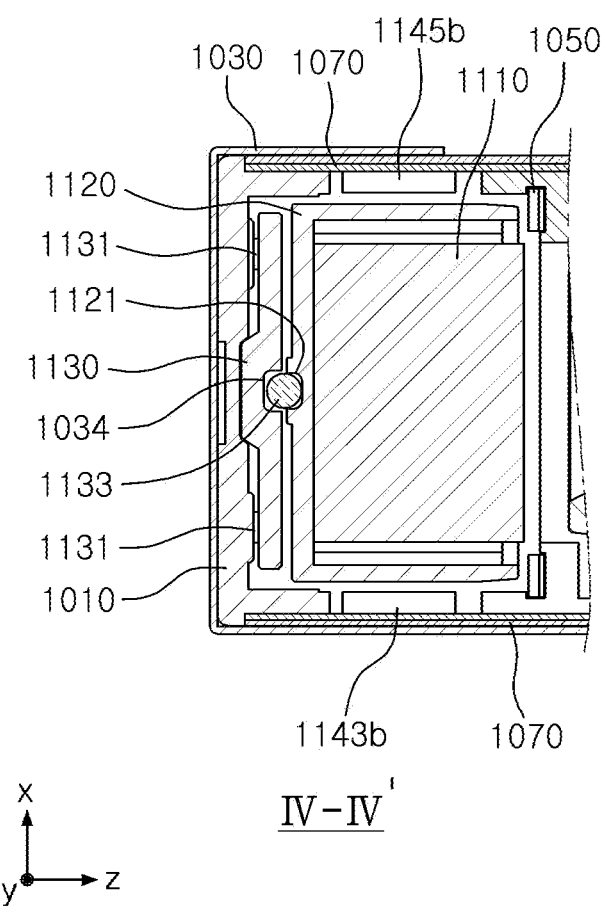
FIGS. 18A to 18C are views schematically illustrating how a rotation holder rotates about a second axis (a Y axis) according to an example of the present disclosure.
Figure 18B:
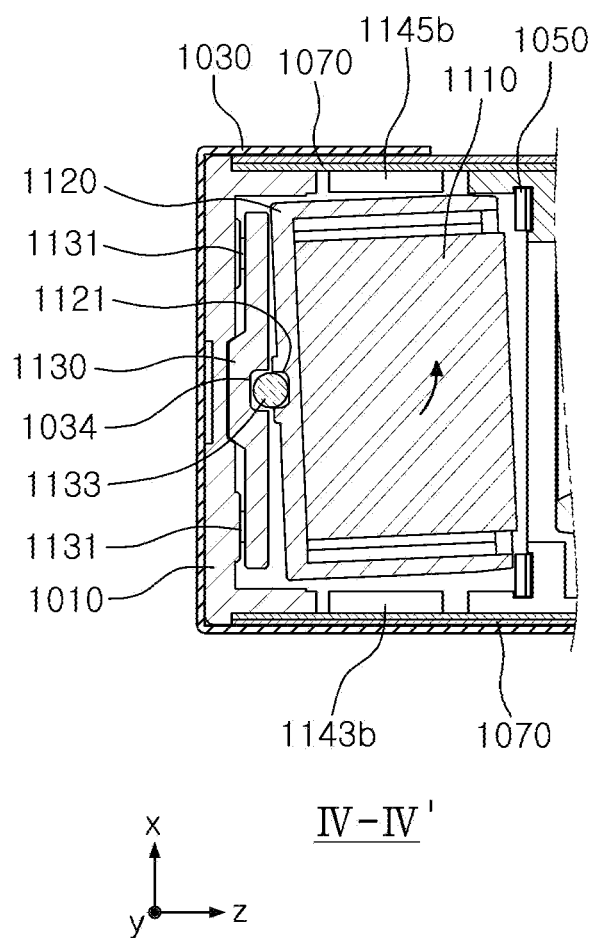
Figure 18C:
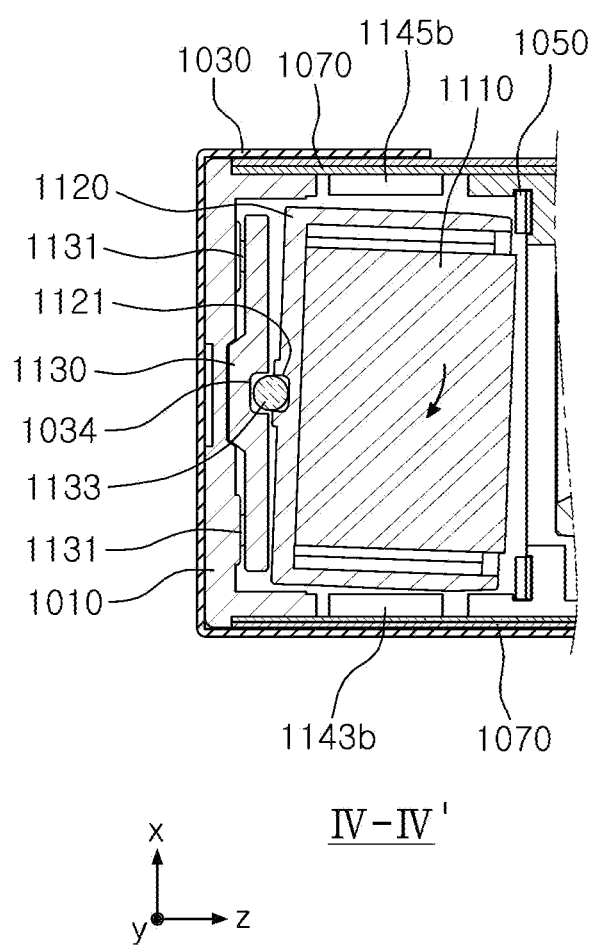

FIGS. 17A to 17C are views schematically illustrating how a rotation holder rotates about a first axis (an X axis) according to an example of the present disclosure, and FIGS. 18A to 18C are views schematically illustrating how a rotation holder rotates about a second axis (a Y axis) according to an example of the present disclosure.

Referring to FIGS. 17A to 17C, when a rotation holder 1120 rotates about the first axis (the X axis), the rotation holder 1120 may rotate, depending on rotation of a rotation plate 1130 about first ball bearings 1131 arranged along the first axis (the X axis) (in this case, the rotation holder 1120 may not be moved relative to the rotation plate 1130). In addition, referring to FIGS. 18A to 18C, when the rotation holder 1120 rotates about the second axis (the Y axis), the rotation holder 1120 may rotate about second ball bearings 1133 arranged along the second axis (the Y axis) (in this case, the rotation plate 1130 is not rotated, and the rotation holder 1120 may thus be moved relative to the rotation plate 1130).

For example, when the rotation holder 1120 rotates about the first axis (the X axis), the first ball bearings 1131 may act, and when the rotation holder 1120 rotates about the second axis (the Y axis), the second ball bearings 1133 may act. The reason is that the second ball bearings 1133 aligned along the second axis (the Y axis) may not be moved in a state in which they are fitted into the seating grooves when the rotation holder 1120 rotates about the first axis (the X axis) and the first ball bearings 1131 aligned along the first axis (the X axis) may not be moved in a state in which they are fitted into seating grooves, when the rotation holder 1120 rotates about the second axis (the Y axis), as illustrated in the drawings.

Light of which a path is changed by a reflection module 1100 may be incident to a lens module 1200. Therefore, optical axes of a plurality of stacked lenses provided in the lens module 1200 may be aligned in the Z axis direction, a direction in which the light is emitted from the reflection module 1100. In addition, the lens module 1200 may include a second driving portion 1240 in order to implement the AF function, the zoom function, and the like. In addition, the lens module 1200 having a relatively low weight since it does not include another component for OIS may be moved in the optical axis direction in order to implement the AF function and the zoom function, and power consumption may thus be significantly reduced.

The lens module 1200 may include a lens holder 1220 provided in an internal space of a housing 1010 and including lenses stacked therein, and the second driving portion 1240 moving the lens holder 1220.

A plurality of lenses capturing an image of a subject may be accommodated in the lens holder 1220, and may be mounted along optical axes in the lens holder 1220.

Light of which the moving direction is changed by the reflection module 1100 may be refracted while passing through the plurality of lenses. The optical axis (the Z axis) of each of the plurality of lenses may be perpendicular to the thickness direction (the Y axis direction) of the lens module 1200.

The lens holder 1220 may be moved in the optical axis direction (the Z axis direction) for the purpose of AF. As an example, the lens holder 1220 may be configured to be movable in a direction (including an opposite direction to the direction) in which the light of which the moving direction is changed by the reflection module 1100 passes through the plurality of lenses.

The second driving portion 1240 may generate driving force such that the lens holder 1220 is movable in the optical axis direction (the Z axis direction). For example, the second driving portion 1240 may move the lens holder 1220 to change a distance between the lens holder 1220 and the reflection module 1100.

As an example, the second driving portion 1240 may include a plurality of magnets 1241a and 1243a, and a plurality of coils 1241b and 1243b disposed to face the plurality of magnets 1241a and 1243a.

When power is applied to the plurality of coils 1241b and 1243b, the lens holder 1220 on which the plurality of magnets 1241a and 1243a are mounted may be moved in the optical axis direction (the Z axis direction) by electromagnetic interaction between the plurality of magnets 1241a and 1243a and the plurality of coils 1241b and 1243b.

The plurality of magnets 1241a and 1243a may be mounted on the lens holder 1220. As an example, the plurality of magnets 1241a and 1243a may be mounted on side surfaces of the lens holder 1220.

The plurality of coils 1241b and 1243b may be mounted on the housing 1010. As an example, the main board 1070 may be mounted on the housing 1010 in a state in which the plurality of coils 1241b and 1243b are mounted on the main board 1070. In this case, a case in which both of the coils for the reflection module 1100 and the coils for the lens module 1200 are mounted on the main board 1070 is illustrated in the drawings for convenience of explanation, however, the main board 1070 is not limited thereto, but may be also provided as separate boards on which the coils for the reflection module 1100 and the coils for the lens module 1200 are mounted, respectively.

In this example, when the lens holder 1220 is moved, a closed loop control manner of sensing and feeding back a position of the lens holder 1220 may be used. Therefore, a position detection sensor 1243c may be required in order to perform a closed loop control. The position detection sensor 1243c may be a Hall sensor.

The position detection sensor 1243c may be disposed inside or outside the coil 1243b, and may be mounted on the main board 1070 on which the coil 1243b is mounted.

The lens holder 1220 may be provided in the housing 1010 to be movable in the optical axis direction (the Z axis direction). As an example, a plurality of ball members 1250 may be disposed between the lens holder 1220 and the housing 1010.

The plurality of ball members 1250 may serve as bearings guiding the movement of the lens holder 1220 in an AF process. In addition, the plurality of ball members 1250 may also serve to maintain an interval between the lens holder 1220 and the housing 1010.

The plurality of ball members 1250 may be rolled in the optical axis direction (the Z axis direction) when driving force in the optical axis direction (the Z axis direction) is generated. Therefore, the plurality of ball members 1250 may guide the movement of the lens holder 1220 in the optical axis direction (the Z axis direction).

A plurality of guide grooves 1221 and 1231 in which the plurality of ball members 1250 are accommodated may be formed in at least one of surfaces of the lens holder 1220 facing the housing 1010 and the housing 1010 facing the lens holder 1220.

The plurality of ball members 1250 may be accommodated in the plurality of guide grooves 1221 and 1231 and be fitted between the lens holder 1220 and the housing 1010.

The plurality of guide grooves 1221 and 1231 may have a length in the optical axis direction (the Z axis direction).

The plurality of ball members 1250 may be limited from being moved in the first axis direction (the X axis direction) and the second axis direction (the Y axis direction) and may be moved in only the optical axis direction (the Z axis direction), in a state in which they are accommodated in the plurality of guide grooves 1221 and 1231. As an example, the plurality of ball members 1250 may be rolled in only the optical axis direction (the Z axis direction).

To this end, each of the plurality of guide grooves 1221 and 1231 may be formed to be elongate in the optical axis direction (the Z axis direction). In addition, cross sections of the plurality of guide grooves 1221 and 1231 may have various shapes such as a round shape, a polygonal shape, and the like.

In this case, the lens holder 1220 may be pressed toward the housing 1010 such that the plurality of ball members 1250 may be maintained in a state in which they are in contact with the lens holder 1220 and the housing 1010.

To this end, the housing 1010 may be provided with yokes 1260 facing the magnets 1241a and 1243a mounted on the lens holder 1220. The yokes 1260 may be formed of a magnetic material.

Attractive force may act between the yokes 1260 and the magnets 1241a and 1243a. Therefore, the lens holder 1220 may be moved in the optical axis direction (the Z axis direction) by the driving force of the second driving portion 1240 in a state in which it is in contact with the plurality of ball members 1250.

Figure 19:
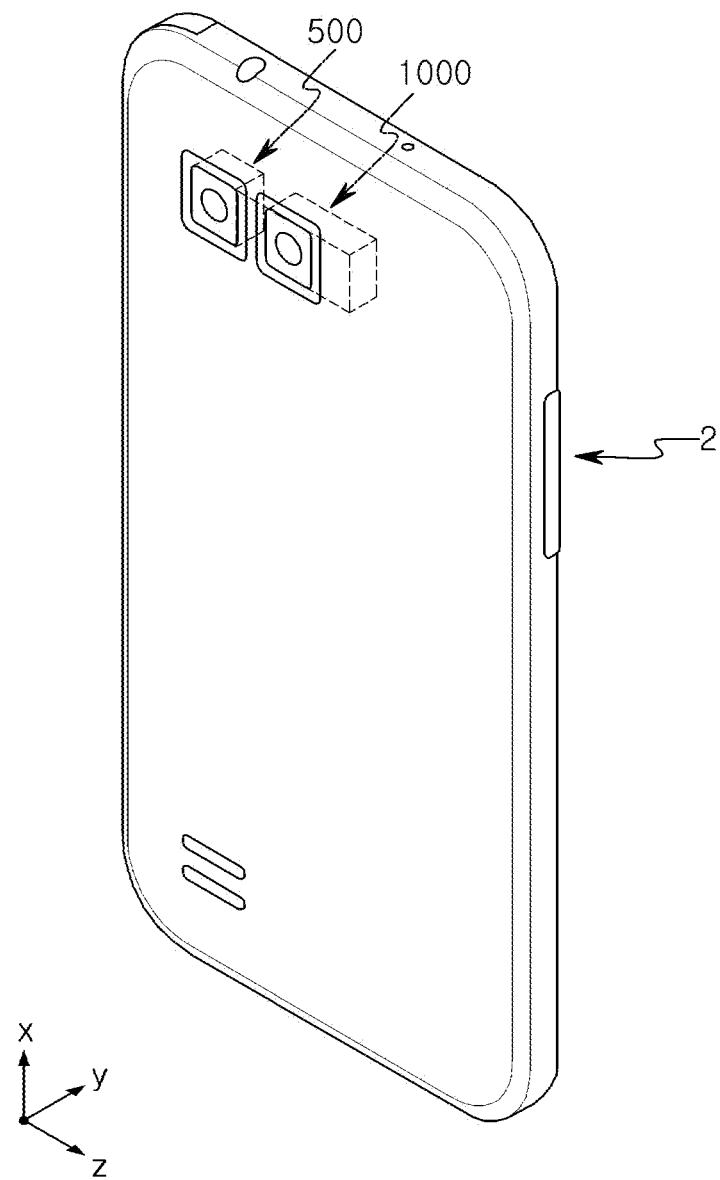
FIG. 19 is a perspective view of a portable electronic device according to another example of the present disclosure.

FIG. 19 is a perspective view illustrating a portable electronic device according to another example of the present disclosure.

Referring to FIG. 19, a portable electronic device 2 according to another example of the present disclosure may be a portable electronic device mounted with a plurality of camera modules 500 and 1000, such as a mobile communications terminal, a smartphone, a tablet PC, a smart watch, smart glasses, or the like.

The plurality of camera modules 500 and 1000 may be mounted in the portable electronic device 2.

At least one of the plurality of camera modules 500 and 1000 may be the camera module 1000 according to an example of the present disclosure and described with reference to FIGS. 2 to 18C.

For example, in the case of a portable electronic device including a dual camera module, at least one of two camera modules may be provided as the camera module 1000 according to an example of the present disclosure.

Through this example, the camera module and the portable electronic device including the same according to an example of the present disclosure may have a simple structure and a reduced size while implementing the functions such as the AF function, the zoom function, the OIS function, and the like. In addition, according to an example of the present disclosure, power consumption may be minimized.

A camera module according to the examples disclosed herein may minimize unwanted influence of a current applied to a coil, may minimize deterioration in position sensing accuracy, even when a position of a magnet is slightly shifted by assembly tolerance or external impact, and may increase sensing sensitivity according to a relative position with a magnet to increase a degree of sensing accuracy.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
   a housing;
   a rotation holder comprising a reflection member, and supported on an inner wall of the housing, wherein the reflection member is rotatable about a first axis, perpendicular to an optical axis and parallel to a bottom of the housing, and is rotatable about a second axis perpendicular to the optical axis and the first axis;
   a sensing magnet disposed on the rotation holder;
   a plurality of driving magnets disposed on the rotation holder, wherein the plurality of driving magnets comprise a first driving magnet, configured to provide a driving force to move the rotation holder in the first axis direction, and a second driving magnet, configured to provide a driving force to move the rotation holder in the second axis direction; and
   a first position detection sensor disposed in the housing to face the sensing magnet and configured to sense movement of the rotation holder in the second axis direction,
   wherein the sensing magnet is disposed to be parallel to the second driving magnet.

2. The camera module according to claim 1, wherein the first position detection sensor is disposed to be biased in a direction, opposite to the inner wall of the housing, from a center of the sensing magnet in the optical axis direction.

3. The camera module according to claim 1, wherein the sensing magnet is a two-pole magnet magnetized with two poles, and of which an N pole and an S pole are sequentially arranged in the second axis direction in which the rotation holder is configured to move.

4. The camera module according to claim 3, wherein the first position detection sensor is disposed to face an intermediate region in which the N pole and the S pole of the sensing magnet meet, when the rotation holder is not driven.

5. The camera module according to claim 3, wherein the sensing magnet is provided with a neutral zone between the N pole and the S pole, and
   wherein a center of the neutral zone is disposed to face a center of the first position detection sensor, when the rotation holder is not driven.

6. The camera module according to claim 1, wherein the first position detection sensor is disposed to be parallel to a driving coil configured to provide driving force to the movement of the rotation holder in the first axis direction.

7. The camera module according to claim 1, further comprising a second position detection sensor configured to sense the movement of the rotation holder in the first axis direction.

8. The camera module according to claim 7, wherein the second position detection sensor is disposed to be parallel to a driving coil configured to provide driving force rotating the rotation holder about the first axis.

9. The camera module according to claim 7, wherein the second position detection sensor is configured to detect a change in a position of the first driving magnet providing driving force moving the rotation holder in the first axis direction.

10. A portable electronic device, comprising:
    the camera module of claim 1 further comprising a lens module configured to refract light reflected from the reflection member, and an image sensor configured to convert the refracted light into an electrical signal to capture an image.

11. A camera module comprising:
    a housing;
    a rotation holder comprising a reflection member, and supported on an inner wall of the housing, wherein the reflection member is movable along a first axis, perpendicular to an optical axis and parallel to a bottom of the housing, and in a second axis direction, perpendicular to the optical axis and the first axis;
    a plurality of driving magnets disposed on the rotation holder, wherein the plurality of driving magnets comprise a first driving magnet, configured to provide a driving force to move the rotation holder in the first axis direction, and a second driving magnet, configured to provide a driving force to move the rotation holder in the second axis direction;
    a sensing magnet disposed on a side surface of the rotation holder, parallel to the second driving magnet; and
    a position detection sensor, disposed in the housing, and configured to detect a change in position of the sensing magnet and the second driving magnet, to sense the movement of the rotation holder in the second axis direction.

12. The camera module according to claim 11, wherein the sensing magnet is disposed to be biased in a direction, opposite to the inner wall of the housing on which the rotation holder is supported, in the optical axis direction.

13. The camera module according to claim 11, wherein the position detection sensor is disposed to be further biased in a direction, opposite to the inner wall of the housing, from a center of the sensing magnet in the optical axis direction.

14. The camera module according to claim 11, wherein the second driving magnet and the sensing magnet are arranged such that an N pole and an S pole are sequentially formed in the second axis direction in which the rotation holder is moving.

15. The camera module according to claim 14, wherein the position detection sensor is disposed to face a boundary between the second driving magnet and the sensing magnet.

16. The camera module of claim 15, wherein the second driving magnet and the sensing magnet are disposed to be spaced apart from each other.

17. The camera module according to claim 14, wherein the second driving magnet is a two-pole magnet magnetized such that the N pole and the S pole are sequentially formed in the optical axis direction,
    wherein the sensing magnet is disposed adjacent to the N pole or the S pole of the second driving magnet, and
    wherein the sensing magnet adjacent to the second driving magnet is disposed adjacent to polarity, different from polarity of the second driving magnet.

18. The camera module according to claim 17, wherein the second driving magnet and the sensing magnet are disposed to contact each other.

19. A portable electronic device, comprising:
the camera module of claim 11 further comprising a lens module configured to refract light reflected from the reflection member, and an image sensor configured to convert the refracted light into an electrical signal to capture an image.

* * * * *